April 4, 1961 D. E. ECKDAHL ET AL 2,978,685
TAPE UNIT CONTROL SYSTEM
Filed Feb. 14, 1955 26 Sheets-Sheet 3
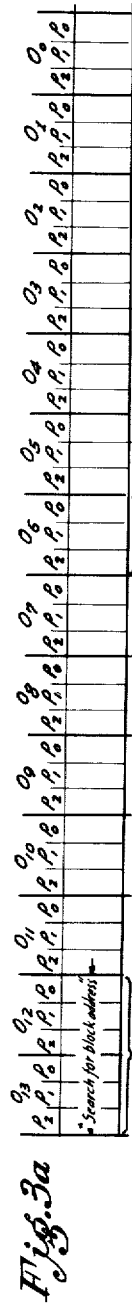
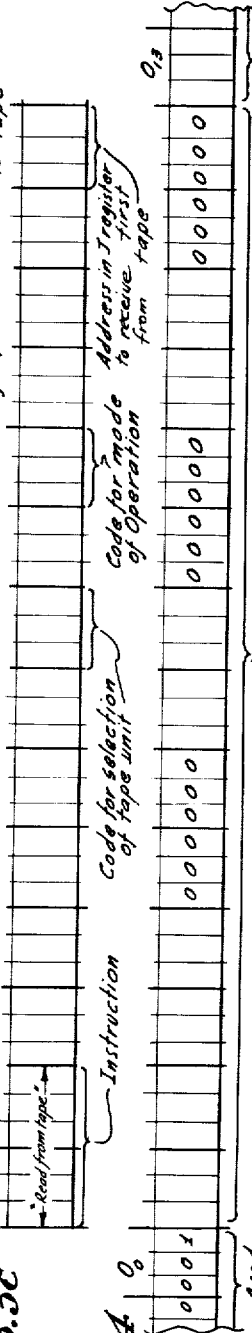
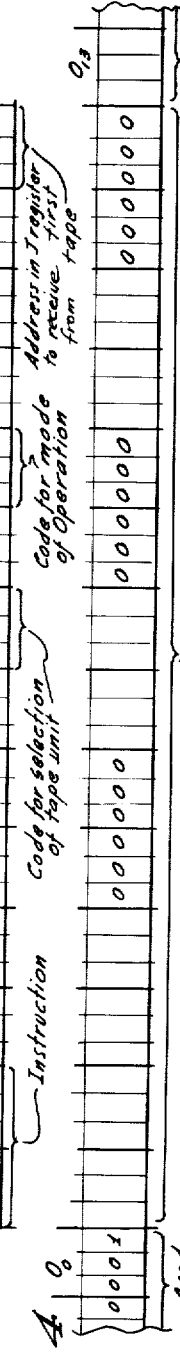
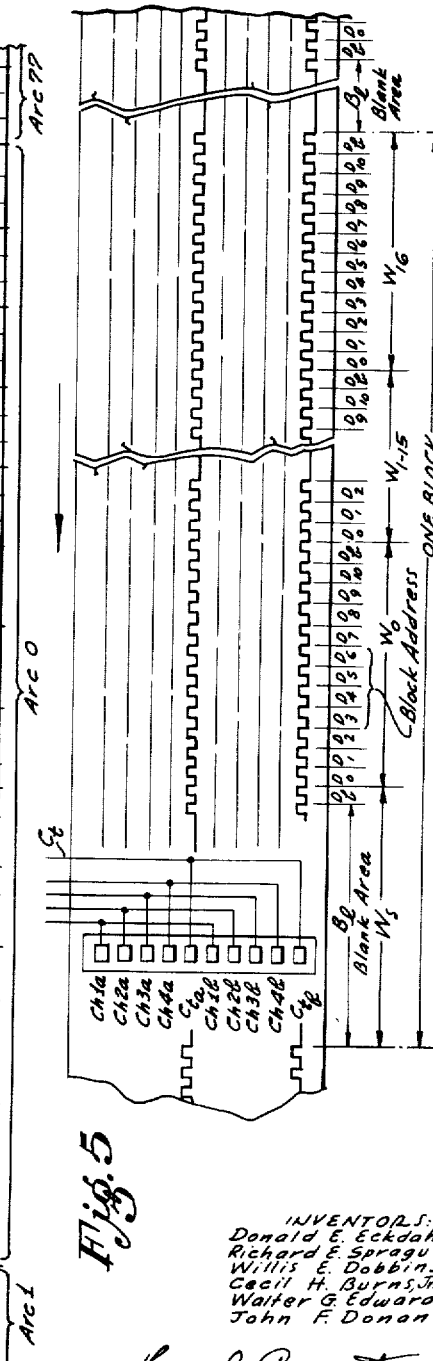
INVENTORS:
Donald E. Eckdahl
Richard E. Sprague
Willis E. Dobbins
Cecil H. Burns, Jr.
Walter G. Edwards
John F. Donan

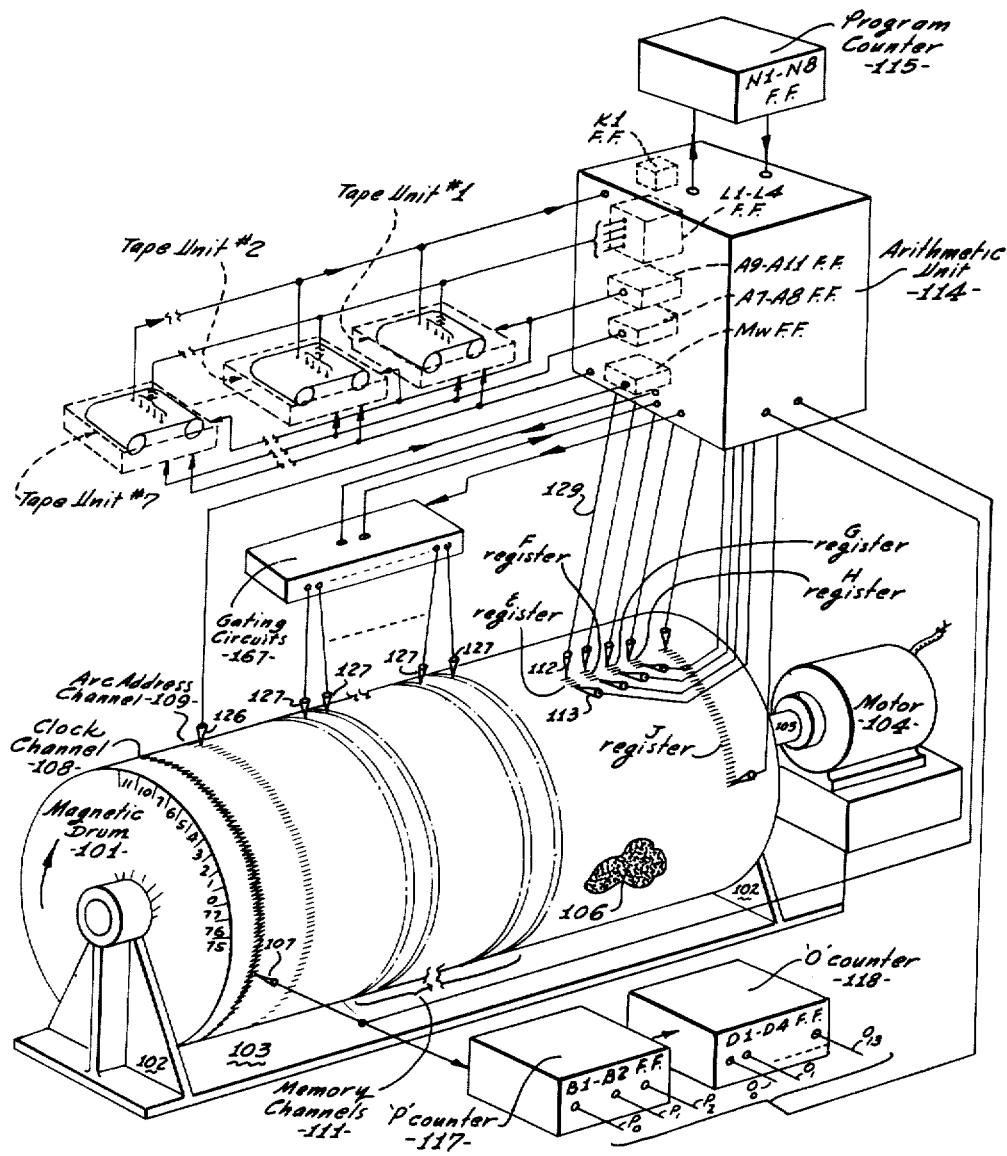

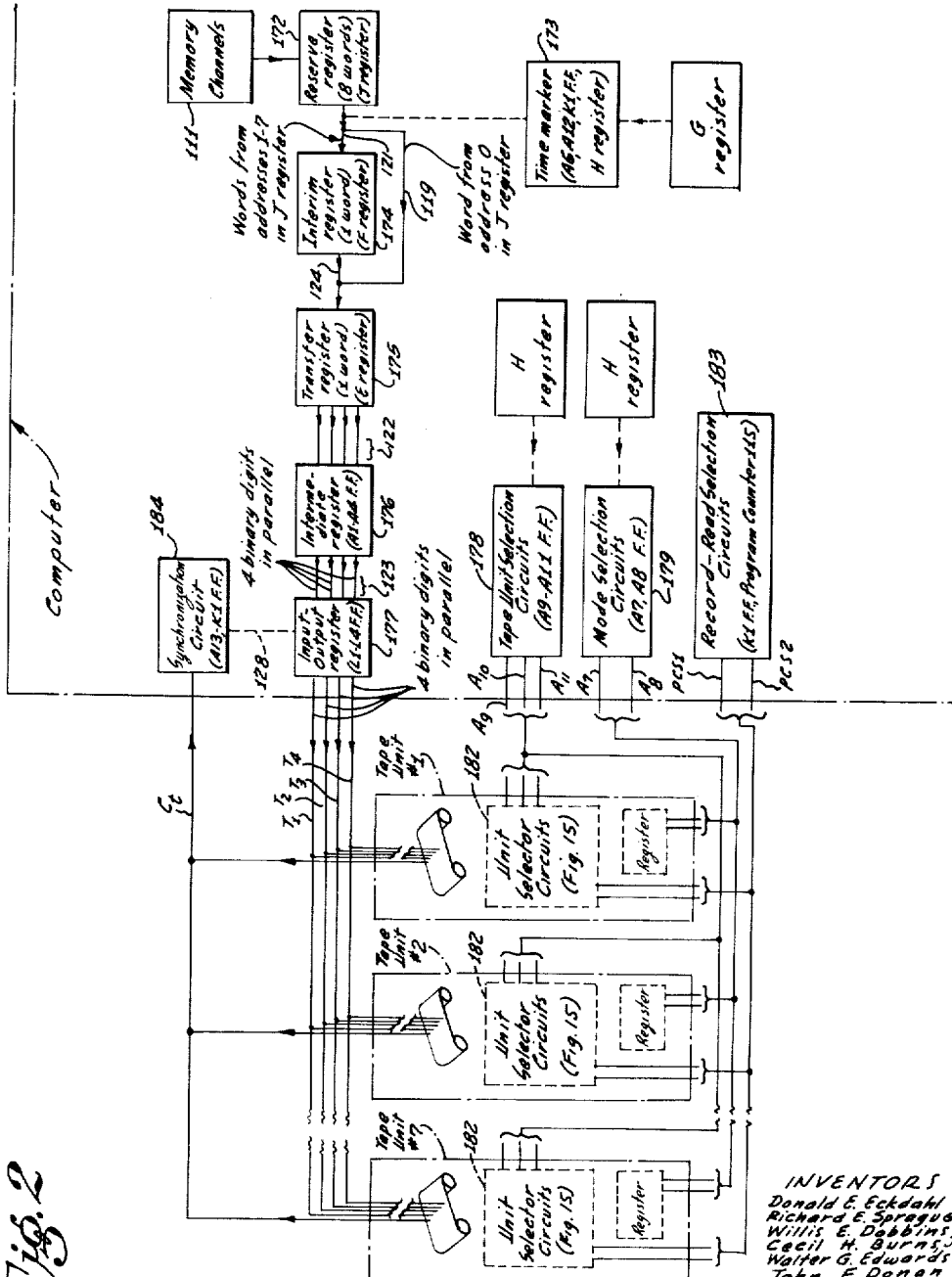

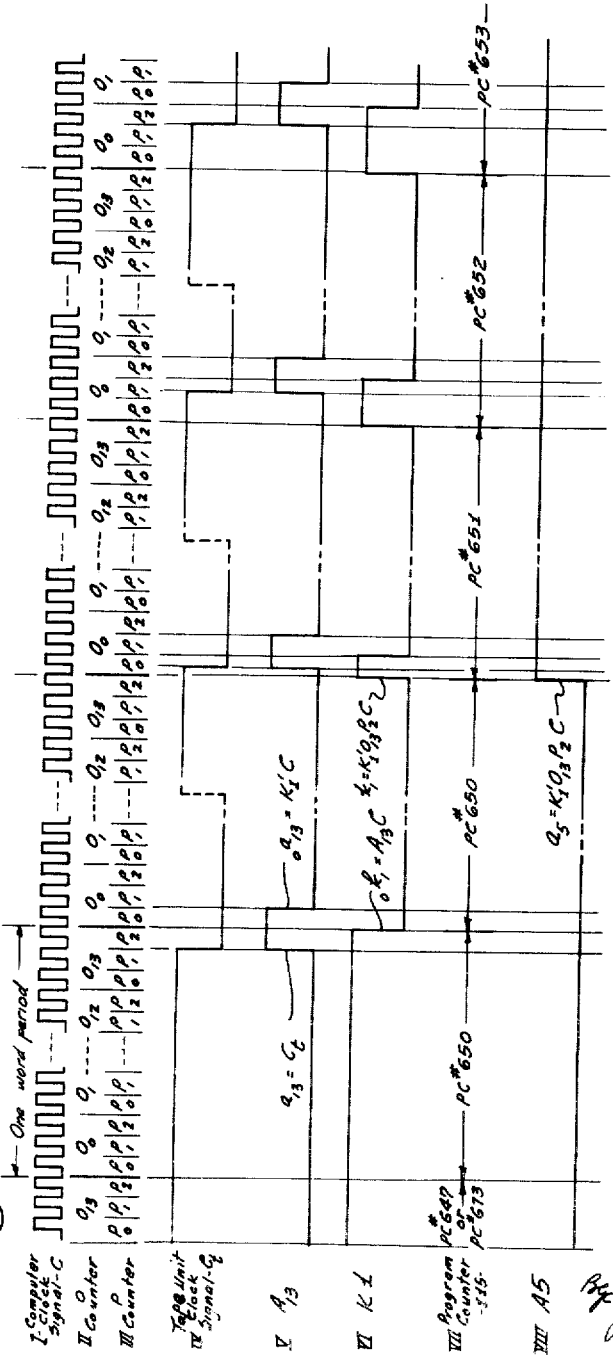

April 4, 1961   D. E. ECKDAHL ET AL   2,978,685
TAPE UNIT CONTROL SYSTEM
Filed Feb. 14, 1955   26 Sheets-Sheet 5
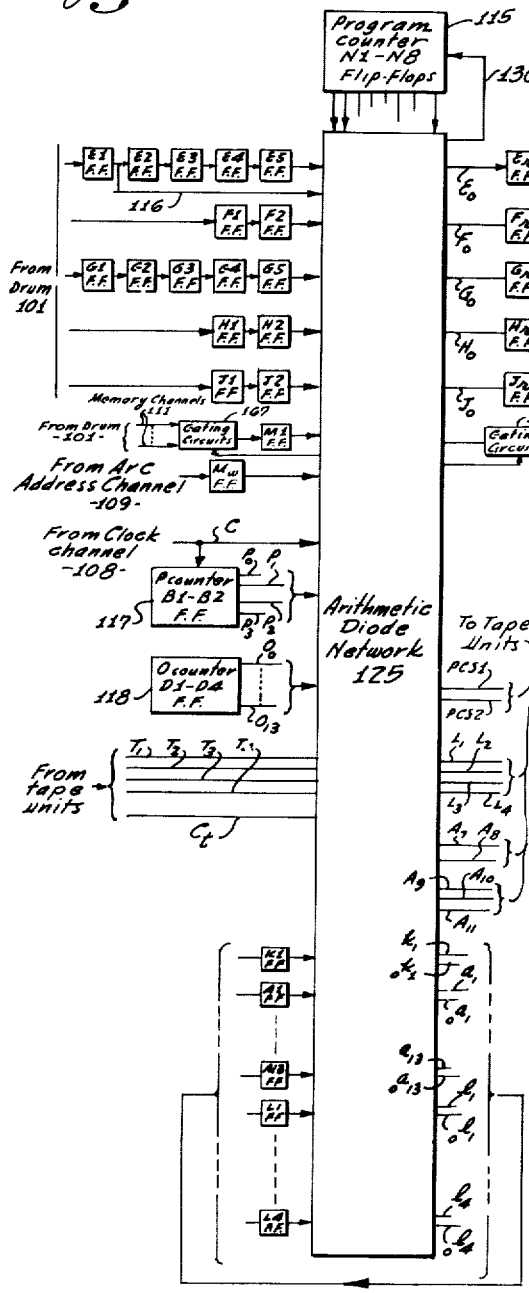
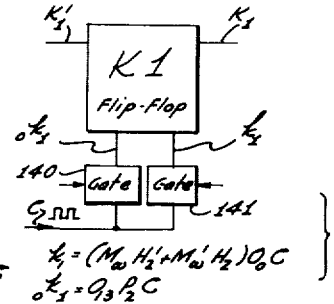
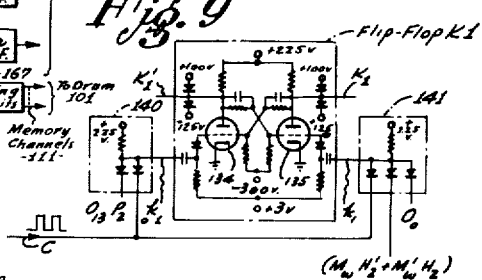
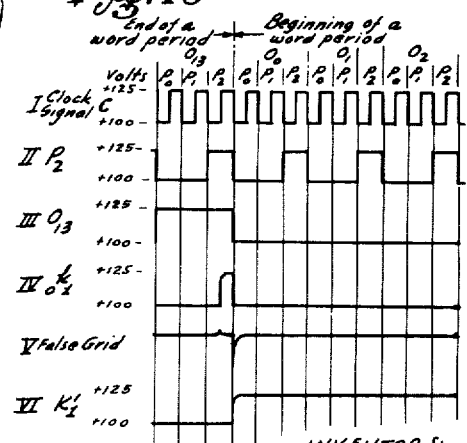
INVENTORS:
Donald E. Eckdahl
Richard E. Sprague
Willis E. Dobbins
Cecil H. Burns, Jr.
Walter G. Edwards
John F. Donan April 4, 1961 D. E. ECKDAHL ET AL 2,978,685
TAPE UNIT CONTROL SYSTEM
Filed Feb. 14, 1955 26 Sheets-Sheet 6

INVENTORS:
Donald E. Eckdahl
Richard E. Sprague
Willis E. Dobbins
Cecil H. Burns, Jr.
Walter G. Edwards
John F. Donan

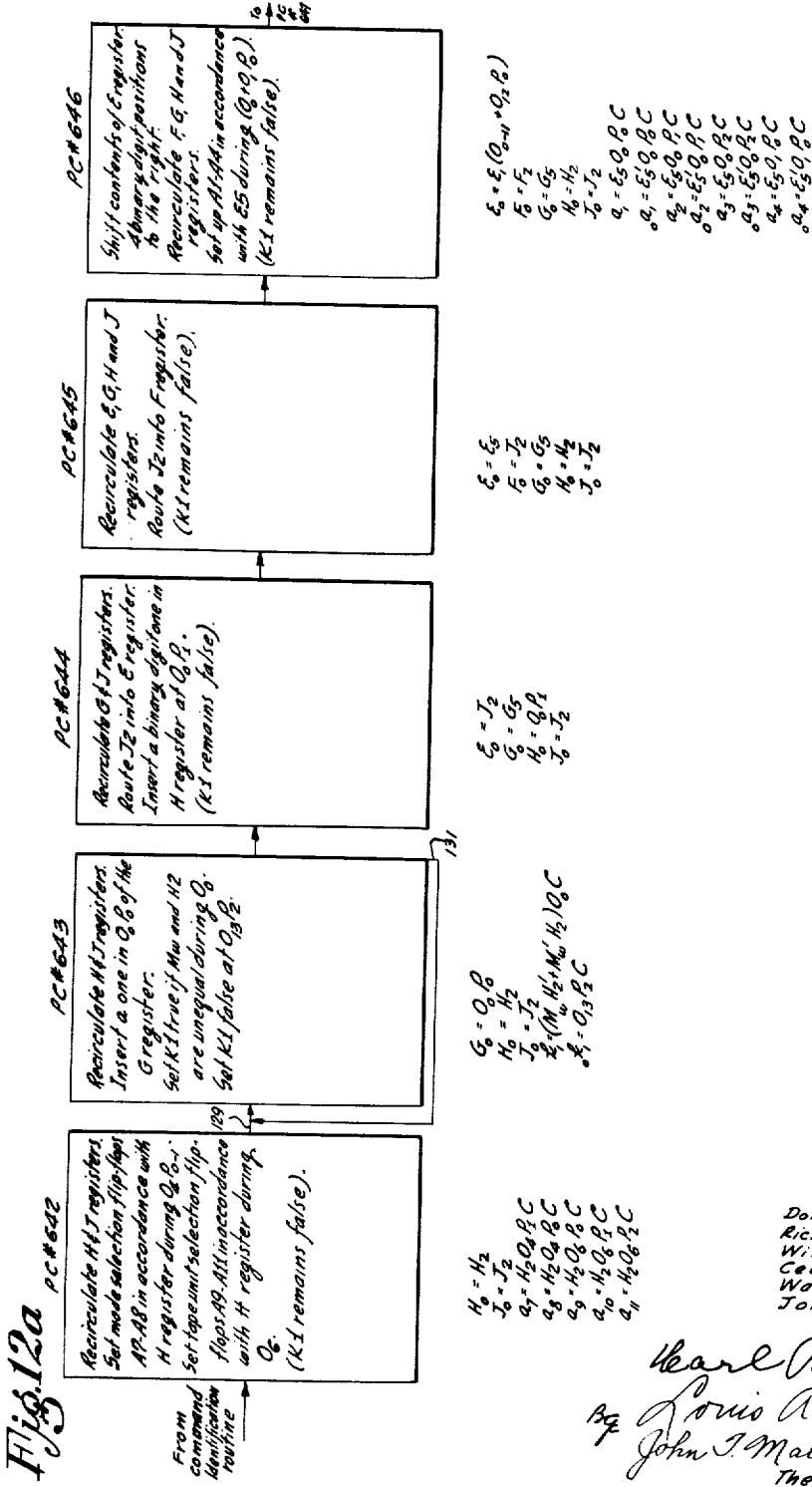

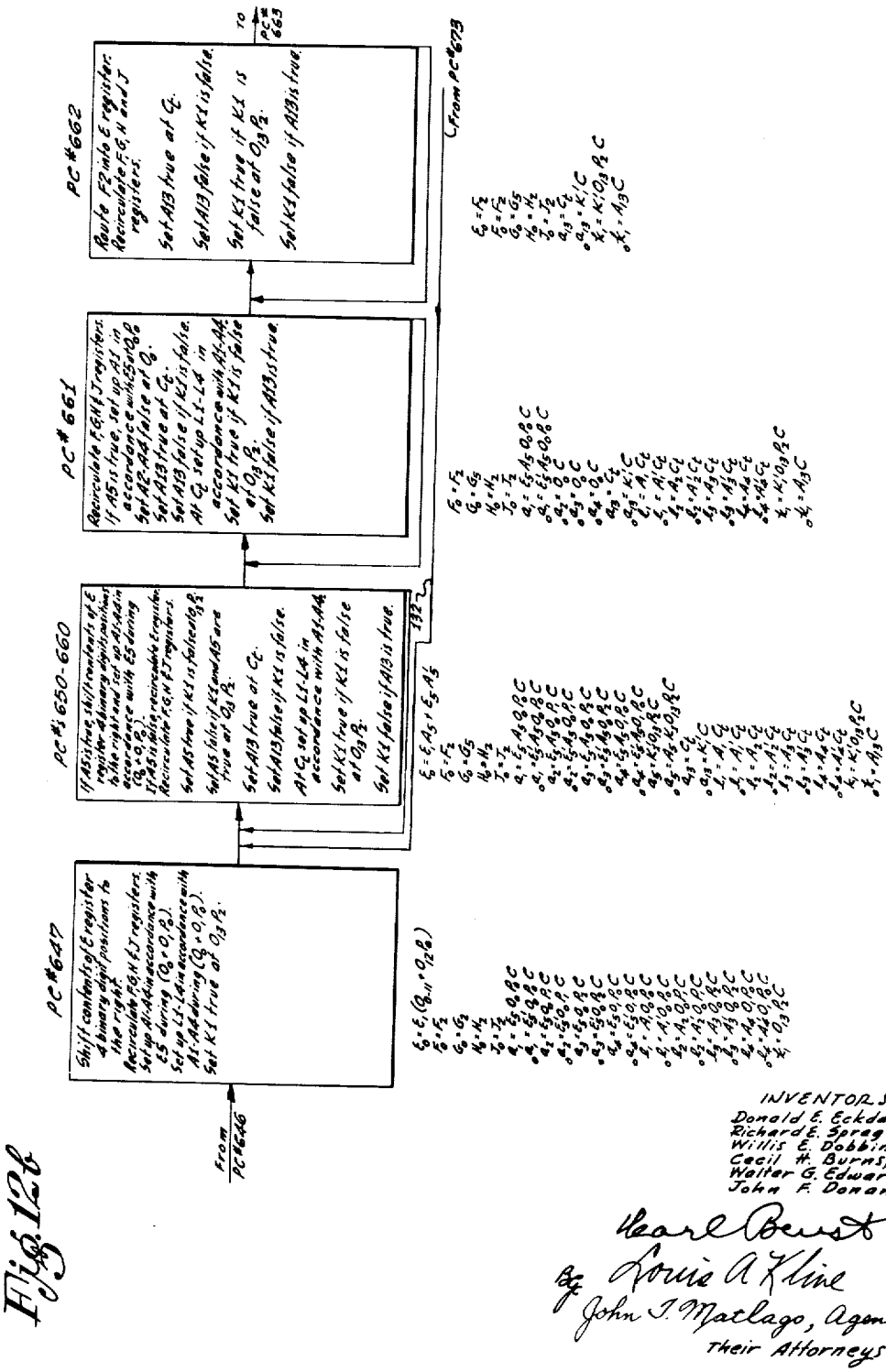

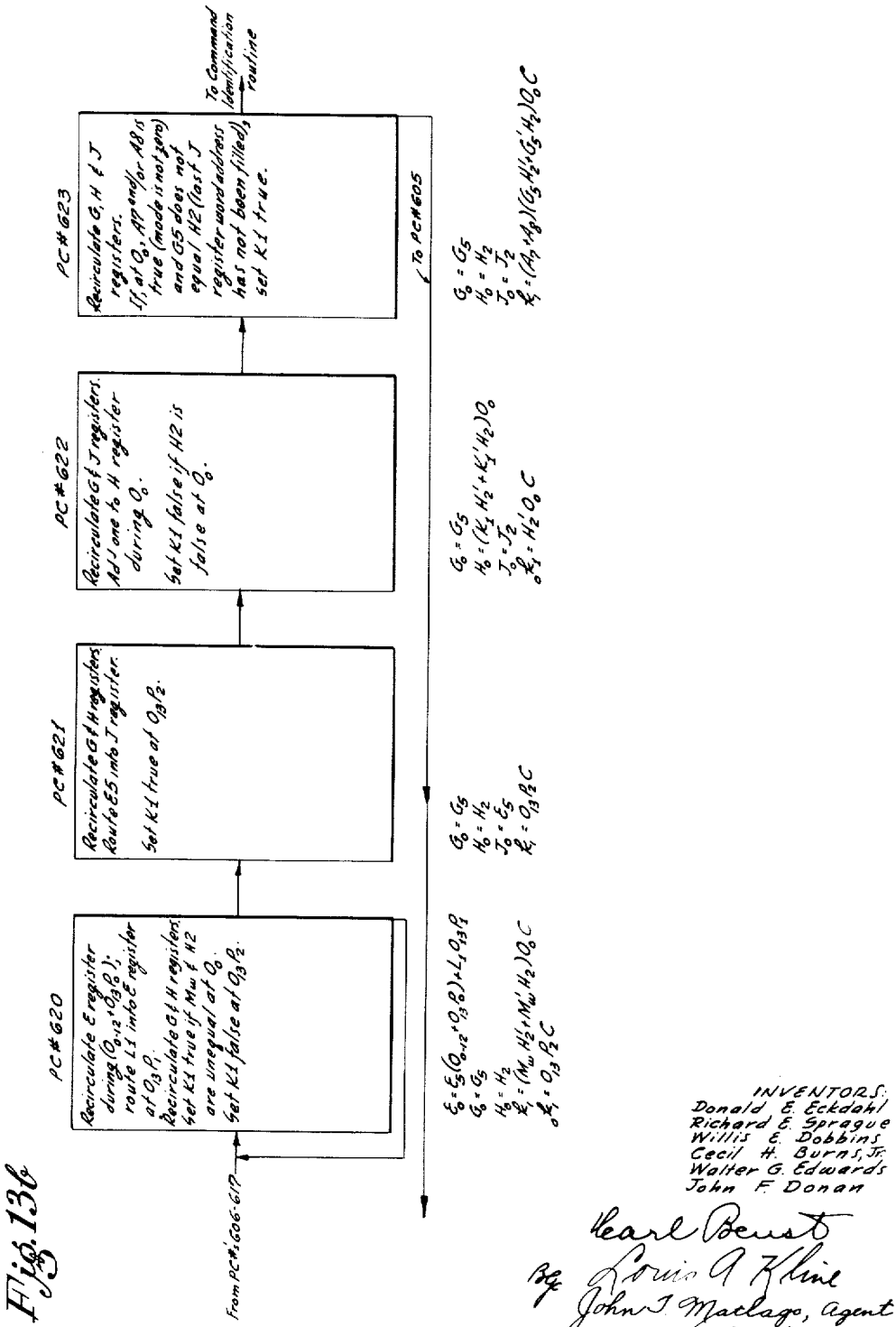

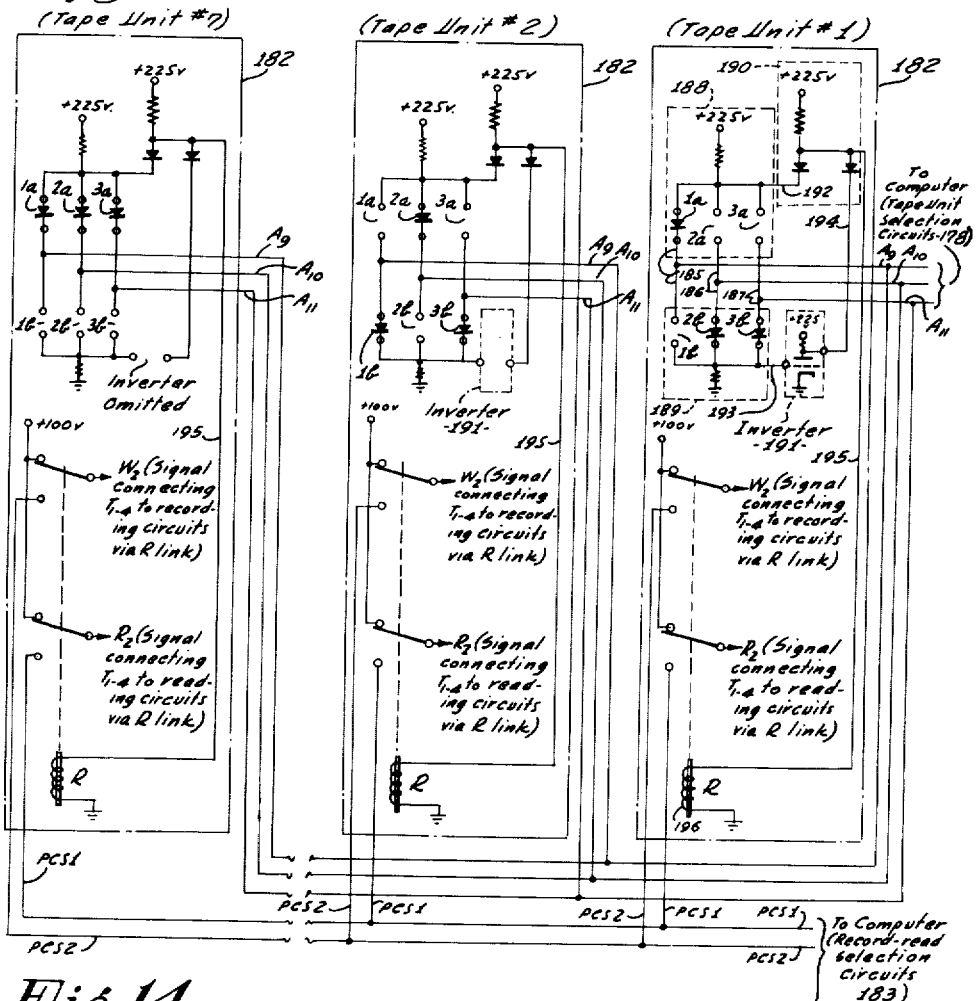

$$F_0 = \#645\, J_2 + (\#646 + \#647 + PCS4 + \#661 + \#662) F_2 + (\#664 + PCS5 + \#672 + \#673)(J_2 A_{12} + F_2 A'_{12})$$

$$G_0 = \#601\, H_2 O_0 + (\#605 + PCS3 + \#620 + \#621 + \#622 + \#623) G_5$$

$$G_0 = (\#642 + \#644 + \#645 + PCS4 + PCS5 + PCS6 + \#661 + \#662 + \#672 + \#673) G_5 + \#643 (O_0 P_0 + G_5 O_{4-7})$$

$$H_0 = (\#605 + PCS3 + \#620 + \#621 + \#623)H_2 + \#622(K_1 H_2' + K_1' H_2)O_0$$

$$H_0 = (\#642 + \#643 + 645 + PCS4 + PCS5 + PCS6 + \#661 + \#662 + \#672)H_2 + \#673[(K_1 H_2' + K_1' H_2)O_{0-3} + H_2 O_{4-13}]J + \#644 O_0' P_1'$$

$$J_0 = (\#605 + PCS3 + \#620 + \#622 + \#623)J_2 + \#621 E_5$$

$$J_0 = PCS2\, J_2$$

INVENTORS:
Donald E. Eckdahl
Richard E. Sprague
Willis E. Dobbins
Cecil H. Burns, Jr.
Walter G. Edwards
John F. Donan Pearl Beust
Louis A. Kline
By John J. Matlago, Agent
Their Attorneys

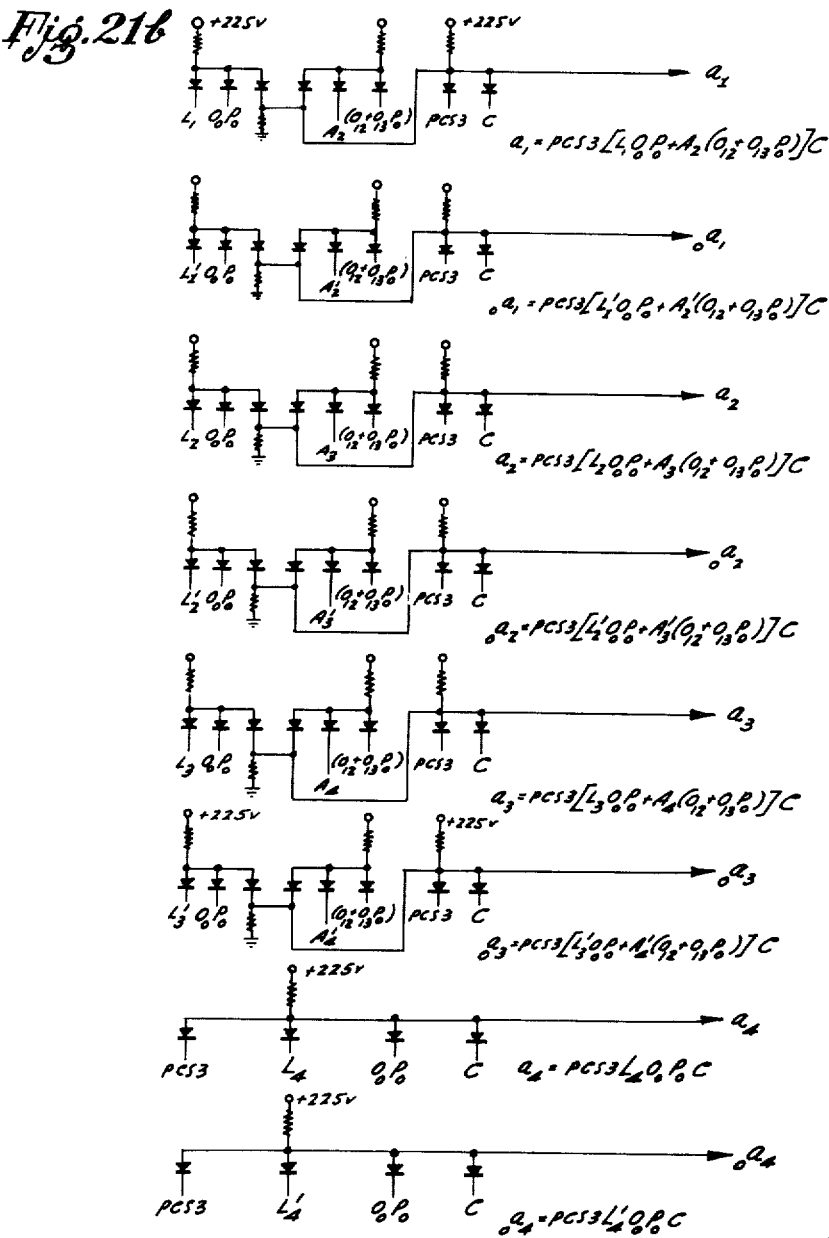

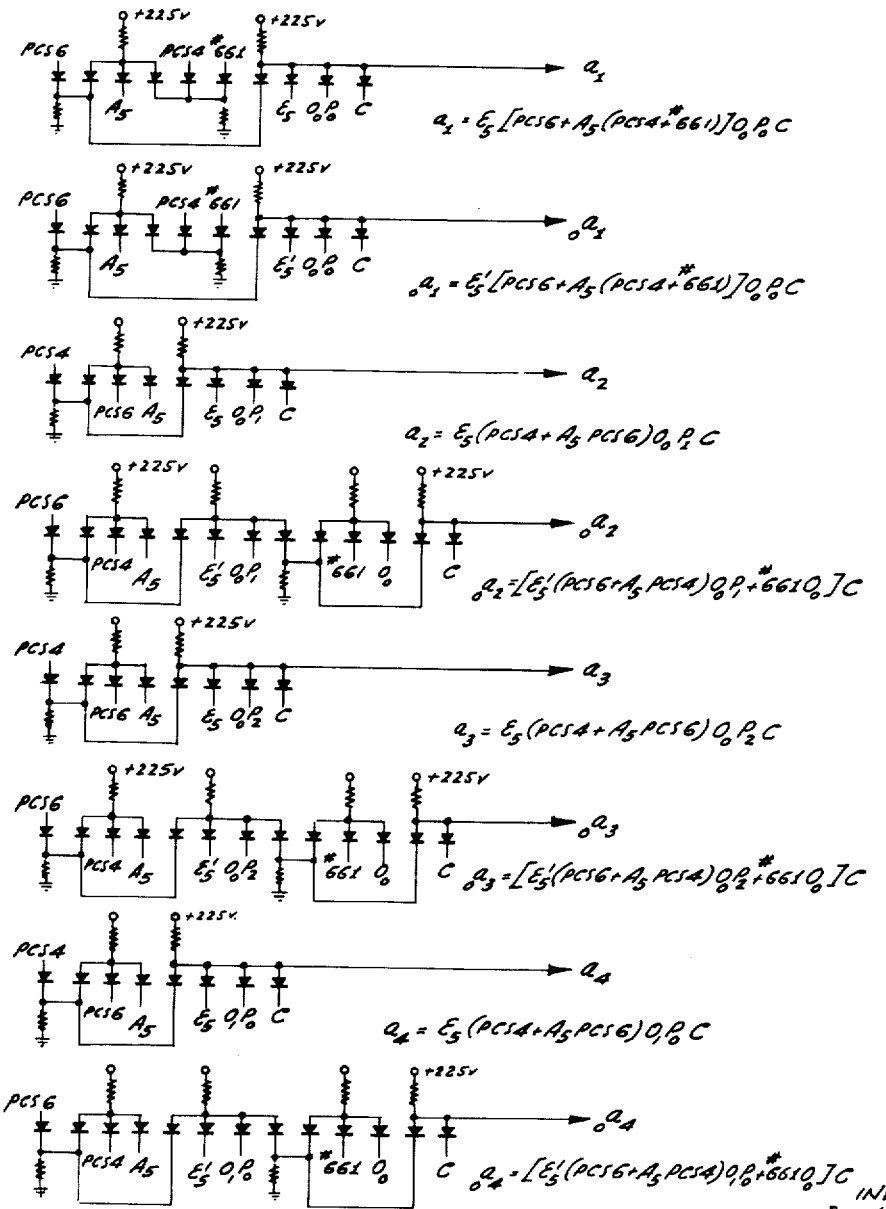

April 4, 1961    D. E. ECKDAHL ET AL    2,978,685
TAPE UNIT CONTROL SYSTEM
Filed Feb. 14, 1955    26 Sheets-Sheet 19
*Fig. 22a*
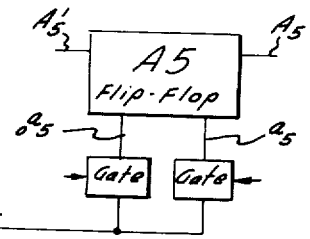
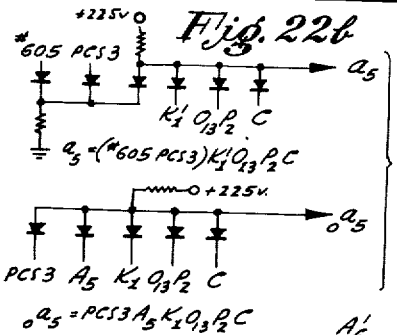
*Fig. 22b*    *Fig. 22c*
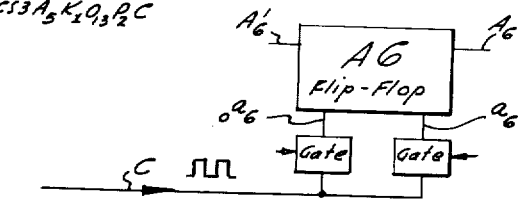
*Fig. 23*
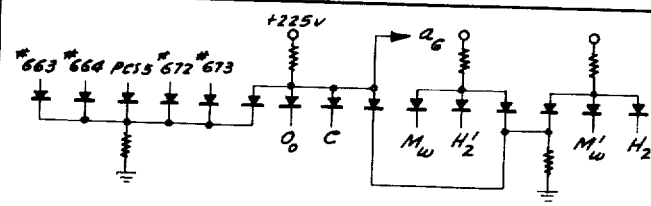
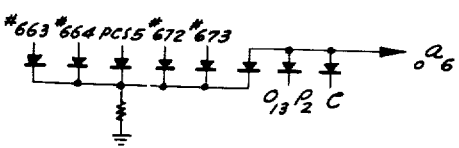
INVENTORS:
Donald E. Eckdahl
Richard E. Sprague
Willis E. Dobbins
Cecil H. Burns, Jr.
Walter G. Edwards
John F. Donan
By Cecil Beust
Louis A. Kline
John T. Matlago, Agent
Their Attorneys April 4, 1961 D. E. ECKDAHL ET AL 2,978,685
TAPE UNIT CONTROL SYSTEM
Filed Feb. 14, 1955 26 Sheets-Sheet 20

Fig. 24

| Operating Modes | FLIP-FLOPS | | |
|---|---|---|---|
| | A7 | A8 | |
| Block address only | 0 | 0 | $A_7' A_8'$ |
| Odd words only | 0 | 1 | $A_7' A_8$ |
| Even words only | 1 | 0 | $A_7 A_8'$ |

Fig. 25a

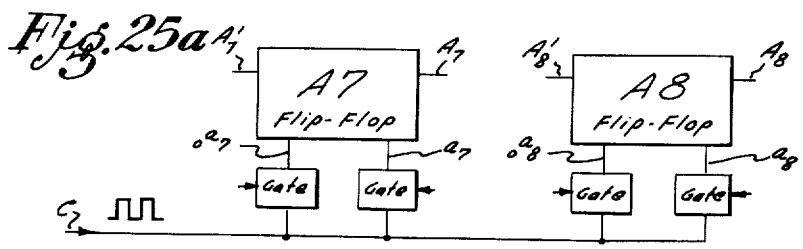

| Read from Tape | $a_7 = \#601\, H_2\, O_4\, P_1\, C$ | $a_8 = \#601\, H_2\, O_4\, P_0\, C$ |
|---|---|---|
| Record on Tape | $a_7 = \#642\, H_2\, O_4\, P_1\, C$ | $a_8 = \#642\, H_2\, O_4\, P_0\, C$ |

Fig. 25b   Fig. 25c

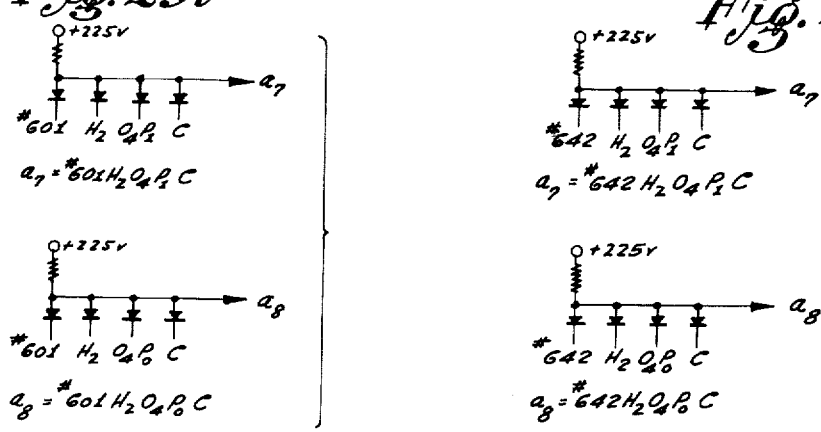

INVENTORS:
Donald E. Eckdahl
Richard E. Sprague
Willis E. Dobbins
Cecil H. Burns, Jr.
Walter G. Edwards
John F. Donan By Earl Beust
Louis A. Kline
John J. Matlago, Agent
Their Attorneys April 4, 1961  D. E. ECKDAHL ET AL  2,978,685
TAPE UNIT CONTROL SYSTEM
Filed Feb. 14, 1955  26 Sheets-Sheet 21

| Read from Tape | $a_9 = {}^\#601\,H_2\,O_6\,P_0\,C$ | $a_{10} = {}^\#601\,H_2\,O_6\,P_1\,C$ | $a_{11} = {}^\#601\,H_2\,O_6\,P_2\,C$ |
|---|---|---|---|
| Record on Tape | $a_9 = {}^\#642\,H_2\,O_6\,P_0\,C$ | $a_{10} = {}^\#642\,H_2\,O_6\,P_1\,C$ | $a_{11} = {}^\#642\,H_2\,O_6\,P_2\,C$ |

INVENTORS:
Donald E. Eckdahl
Richard E. Sprague
Willis E. Dobbins
Cecil H. Burns, Jr.
Walter G. Edwards
John F. Donan By Earl Beust
Louis A. Kline
John J. Matlago, Agent
Their Attorneys April 4, 1961

D. E. ECKDAHL ET AL 2,978,685

TAPE UNIT CONTROL SYSTEM

Filed Feb. 14, 1955

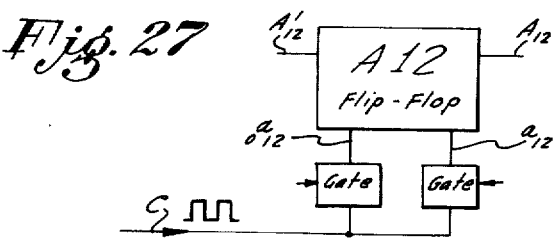

| Record on Tape | $a_{12} = (^\#663 + ^\#664 + PCS5 + ^\#672 + ^\#673) A_6' O_{13} P_2 C$ |
|---|---|
| | $_0 a_{12} = (^\#663 + ^\#664 + PCS5 + ^\#672 + ^\#673) A_6 O_{13} P_2 C$ |

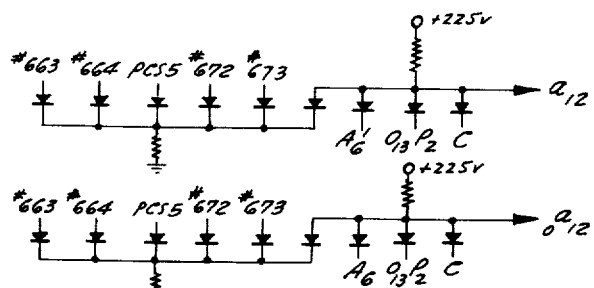

*Fig. 28a*

| Read from Tape | $a_{13} = (^\#605 + PCS3) C_t$ |
|---|---|
| | $_0 a_{13} = (^\#605 + PCS3) K_1' C$ |
| Record on Tape | $a_{13} = (PCS4 + ^\#661 + ^\#662) C_t$ |
| | $_0 a_{13} = (PCS4 + ^\#661 + ^\#662) K_1' C$ |

*Fig. 28b*

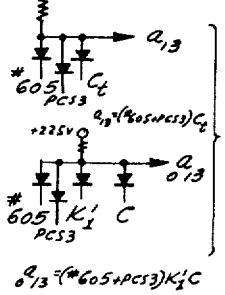

*Fig. 28c*

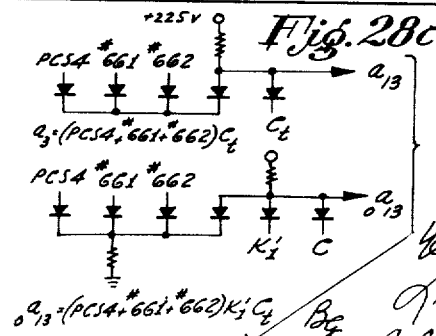

INVENTORS:
Donald E. Eckdahl
Richard E. Sprague
Willis E. Dobbins
Cecil H. Burns, Jr.
Walter G. Edwards
John F. Donan Earl Beust
Louis A. Kline
John J. Matlago, Agent
Their Attorneys April 4, 1961
D. E. ECKDAHL ET AL
2,978,685
TAPE UNIT CONTROL SYSTEM
Filed Feb. 14, 1955
26 Sheets-Sheet 24
*Fig. 29b*
*Fig. 29c*
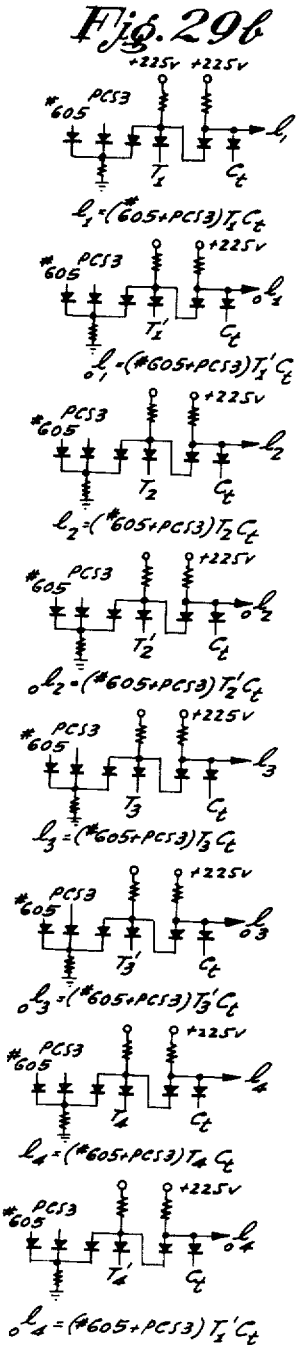

Fig. 30a

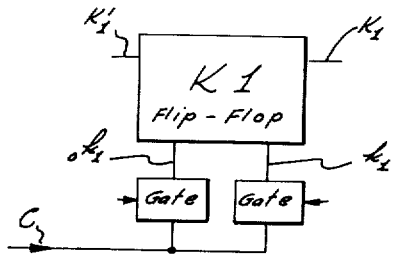

| Read from Tape | |
|---|---|
| "Sticking" until address in J register is as specified by the command. | $k_1 = \#620(M_w H_2' + M_w' H_2)O_o C$ <br> $_o k_1 = \#620\, O_{13} P_2 C$ |
| "Sticking" until subsequent addresses in J register occur. | $k_1 = \#621\, O_{13} P_2 C$ <br> $_o k_1 = \#622\, H_2' O_o C$ |
| "Counting" at end of read routine as shown by operating mode. | $k_1 = \#623(A_7 + A_8)O_o C$ |
| "Counting" at end of read routine as shown by filling of J register. | $k_1 = \#623(G_5 H_2' + G_5' H_2)O_o C$ |
| Synchronizing with Tape Unit clock $C_t$ | $k_1 = (\#605 + PCS3)K_1' O_{13} P_2 C$ <br> $_o k_1 = (\#605 + PCS3)A_{13} C$ |
| Record on Tape | |
| "Sticking" until address in J register is as specified by the command. | $k_1 = \#643(M_w H_2' + M_w' H_2)O_o C$ <br> $_o k_1 = \#643\, O_{13} P_2 C$ |
| "Sticking" until subsequent addresses in J register occur. | $k_1 = \#673\, O_{13} C$ <br> $_o k_1 = \#673\, H_2' O_{-3} C$ |
| "Skipping" at end of write routine as shown by operating mode. | $_o k_1 = \#663(A_7 + A_8) O_o C$ |
| "Skipping" at end of write routine as shown by emptying of J register. | $_o k_1 = \#663(G_5 H_2' + G_5' H_2) O_o C$ |
| Synchronizing with Tape Unit clock $C_t$ | $k_1 = [\#647 + (PCS4 + \#661 + \#662)K_1']O_{13} P_2 C$ <br> $_o k_1 = (PCS4 + \#661 + \#662)A_{13} C$ |

INVENTORS:
Donald E. Eckdahl
Richard E. Sprague
Willis E. Dobbins
Cecil H. Burns, Jr.
Walter G. Edwards
John F. Donan April 4, 1961

D. E. ECKDAHL ET AL 2,978,685

TAPE UNIT CONTROL SYSTEM

Filed Feb. 14, 1955

INVENTORS:
Donald E. Eckdahl
Richard E. Sprague
Willis E. Dobbins
Cecil N. Burns, Jr.
Walter G. Edwards
John F. Donan Earl Beust
Louis A. Kline
By John T. Matlago, Agent
Their Attorneys

United States Patent Office 2,978,685
Patented Apr. 4, 1961

2,978,685

TAPE UNIT CONTROL SYSTEM

Donald E. Eckdahl, Palos Verdes Estates, Richard E. Sprague, Rolling Hills, Willis E. Dobbins, Manhattan Beach, Cecil H. Burns, Jr., Norwalk, Walter G. Edwards, Hermosa Beach, and John F. Donan, Reseda, Calif., assignors to The National Cash Register Company, Dayton, Ohio, a corporation of Maryland Filed Feb. 14, 1955, Ser. No. 487,772

19 Claims. (Cl. 340—174.1)

The present invention relates to means for enabling magnetic tape to be employed, for example, as an auxiliary memory for a large scale digital computer and, more particularly, to apparatus adapted to convey information between the computer memory and a plurality of magnetic tapes.

In electronic computational activity, the main memory of a large scale digital computer, such as the magnetic drum, provides sufficient internal storage for the execution of most problems of moderate complexity. However, the drum memory capacity is limited, and for those applications which require exceptionally long programs, or many programs, or large quantities of tabular data, some automatic data storage medium external to the computer is necessary. A magnetic tape memory storage system is highly suitable for such auxiliary memories because of the additional large memory area it provides and its flexibility of handling. Thus, in addition to providing greatly expanded memory facilities for the computer with which it is used, it may also serve as a quickly accessible computer repository of tables of empirical and higher functions, statistical tables, computer subroutines, computer conversion programs, business records such as inventory, financial and payroll data, and various other storage forms as the user requires. Of course, it is also useful as input-output equipment for the computer. When a large volume of information or input-output data is to be stored, several magnetic tape storage systems may be connected to a single computer; similarly, additional systems may be added to a computer system as memory storage requirements increase. Also, since the tape employed in the tape handling system is removable without obliterating or altering information stored on it, a library of information or input-output data may be accumulated for intermittent use in the computer system.

The preferred embodiment of the present invention comprises means for accomplishing the transfer of information between the computer memory and the magnetic tape and is especially suitable for employment with a computer such as described in a co-pending application, Serial Number 325,144, filed December 10, 1952, and a tape unit such as described in a co-pending application, Serial Number 462,752, filed October 18, 1954.

It is also an object of this invention to provide means of employing a plurality of tape units with the computer and, concomitantly, provide circuitry for selecting a particular tape unit. Prominent features of this aspect of the invention are simplicity, rapidity, minimization of attention required from operating peronnel, and versatility which permits substitution or rearrangement of tape units.

A further object of this invention is to provide apparatus for synchronizing the operation of the computer with the selected tape unit such that operations of the former are delayed appropriate intervals corresponding to operations of the latter.

A still further object of this invention is to provide a fast-acting cyclical step process conforming to the basic principles of logical design, for the transfer of information between a computer memory and a tape unit magnetic tape.

Another object of this invention is to provide means for converting the parallel information typical of the tape unit to the serial form required by the computer employed.

Other objects and many of the attendant advantages of this invention will become readily appreciated as the same becomes better understood by reference to the preferred embodiment detailed in the following description and the accompanying drawings wherein:

Fig. 1 is a perspective view illustrating the cooperative relationship of relevant portions of the computer system exemplifying the present invention.

Fig. 2 is a block diagram for explaining the cooperative relation of the various components of the system of the present invention.

Figs. 3a, 3b, and 3c show details of the coded pattern employed during a word period to represent the commands "search for block address," "record on tape," and "read from tape," respectively.

Fig. 4 shows a portion of the arc address channel and how the code pattern of the arc address 0 is recorded thereon.

Fig. 5 shows the details of a section of the magnetic tape of a tape unit showing the flux area divisions.

Fig. 6 is a graph of the waveforms concerned with the synchronization of computer operations with clock pulses of the tape unit.

Fig. 7 is an overall diagram of the computer arithmetic unit showing relevant inputs, outputs, and storage flip-flops.

Fig. 8 is a block diagram of flip-flop K1 together with the logical equations defining its operation during PC#643.

Fig. 9 is a schematic diagram of flip-flop K1.

Fig. 10 is a graph of the waveforms concerned with the $k_1$ triggering equation during PC#643.

Figure 11:
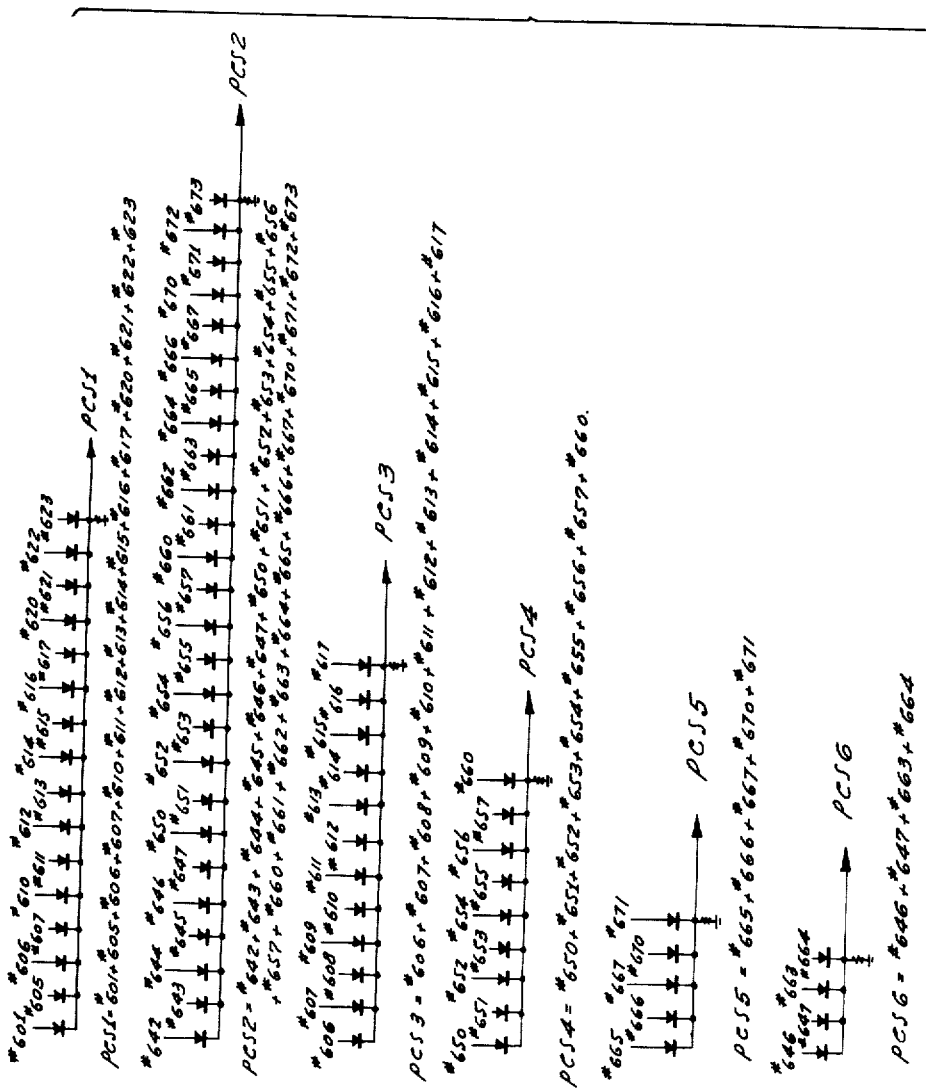

Fig. 11 shows the diode networks provided for generating the program counter sum logical propositions which render the required networks of the arithmetic unit effective during a word period.

Figure 12C:
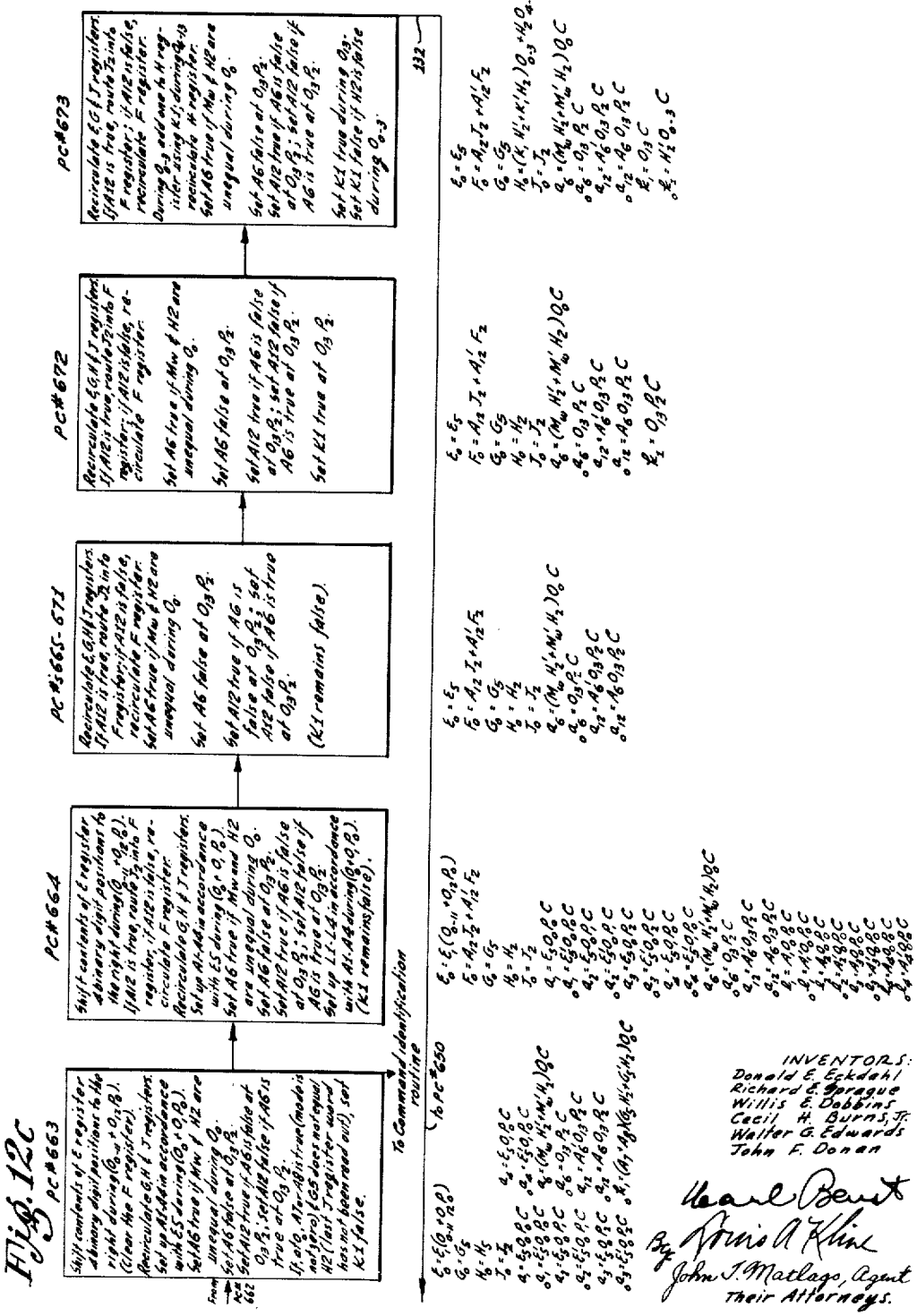

Figs. 12a, 12b, and 12c show the portion of the functional flow diagram of the computer which accomplishes the "record on tape" routine.

Figure 13A:
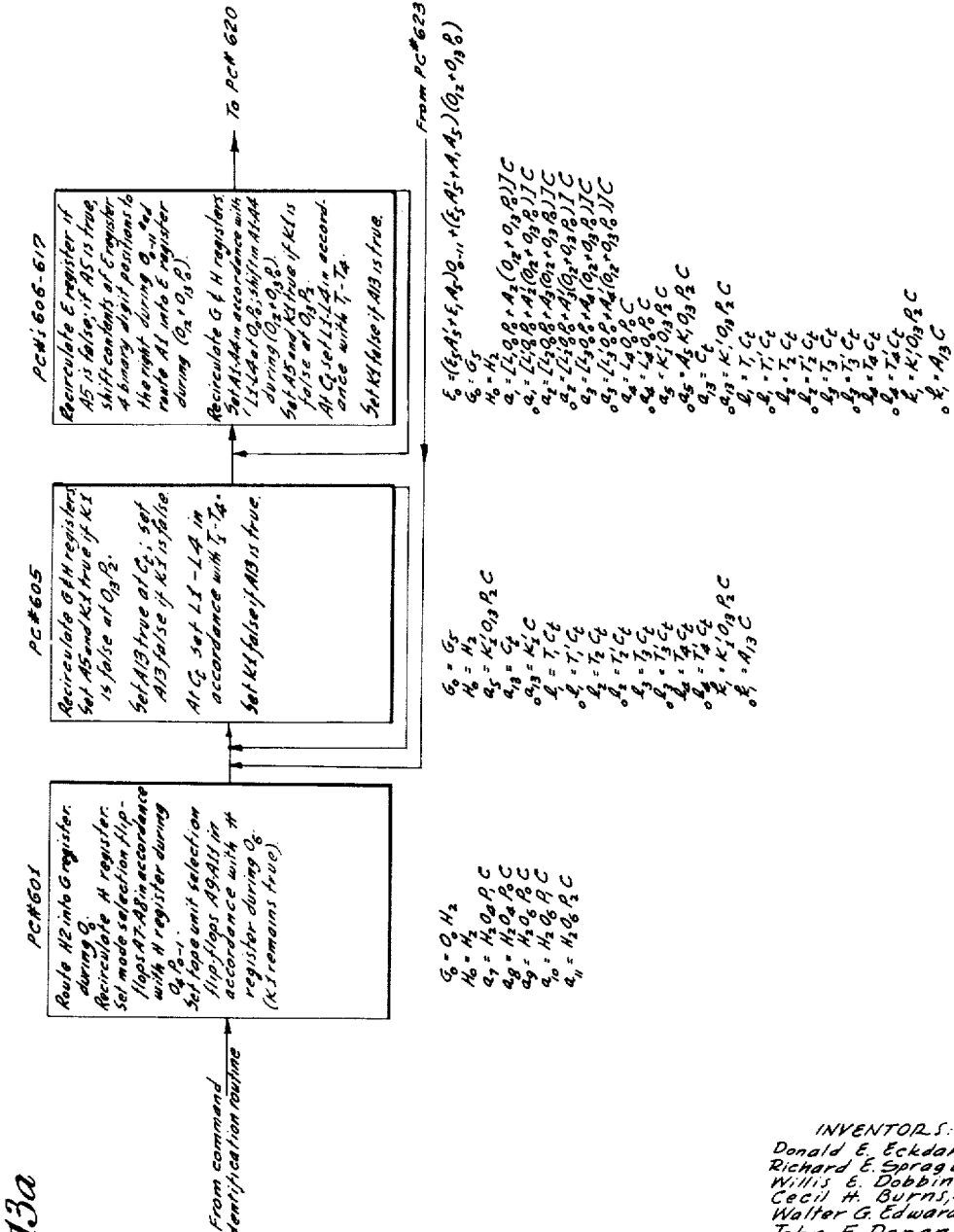

Figs. 13a and 13b show the portion of the functional flow diagram of the computer which accomplishes the "read from tape" routine.

Fig. 14 is a table showing the states of flip-flops A9 to A11 and the corresponding diode positions in the tape units.

Fig. 15 shows a diagram of the selector circuits provided in the tape units.

Figure 16A:
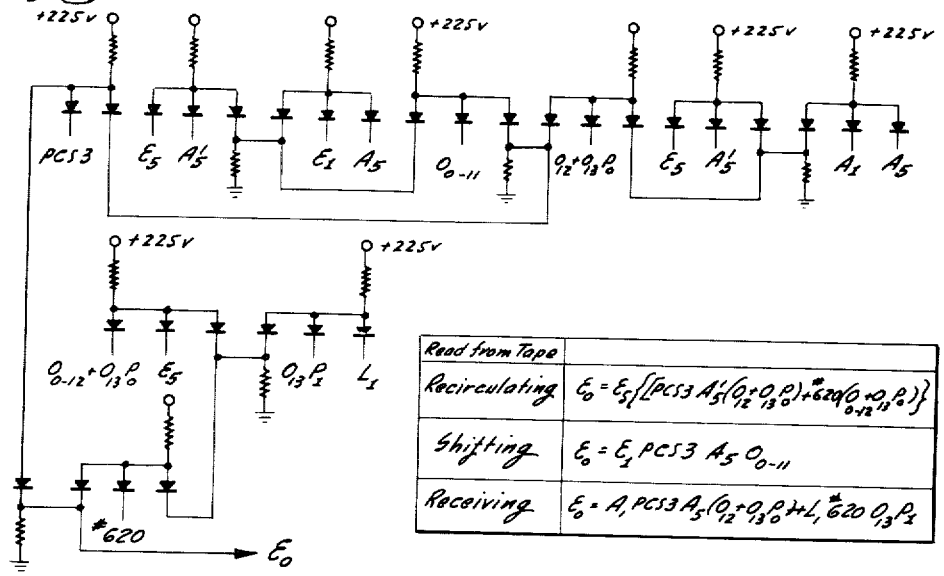
Figure 16B:
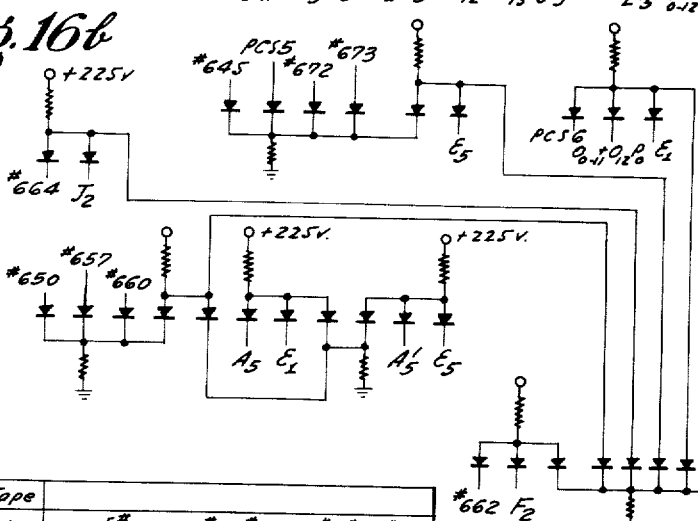

Figs. 16a and 16b show the diode networks for generating the equations for proposition $E_0$ during the "read from tape" and "record on tape" routines, respectively.

Figure 17:
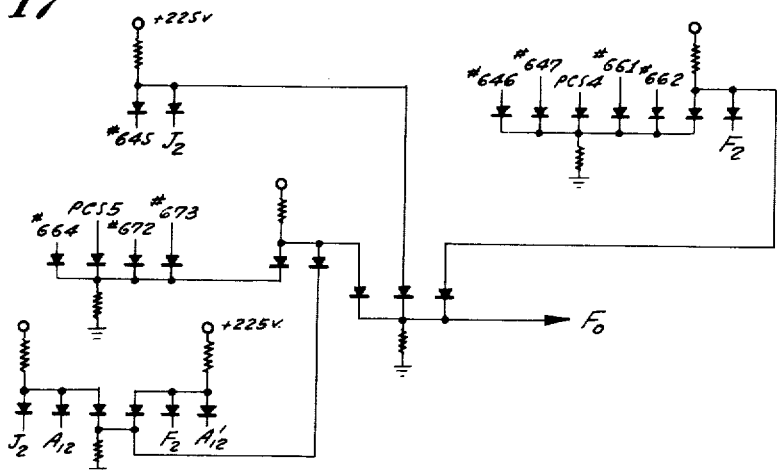

Fig. 17 shows the diode networks for generating the equation for proposition $F_0$.

Figure 18A:
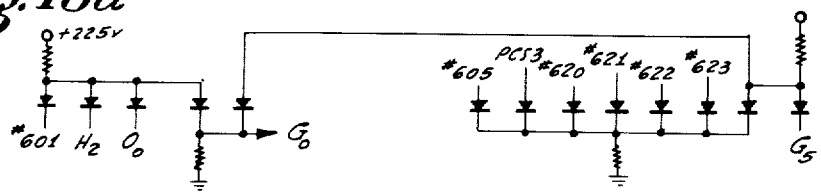
Figure 18B:
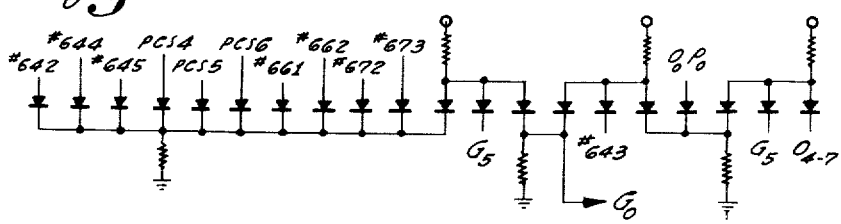

Figs. 18a and 18b show the diode networks for generating the equations for proposition $G_0$ during the "read from tape" and "record on tape" routines, respectively.

Figure 19A:
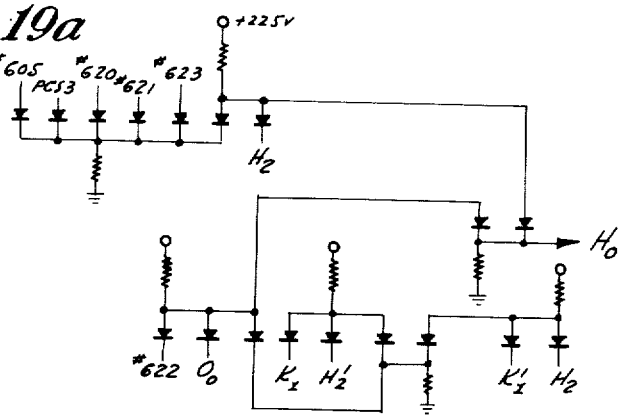
Figure 19B:
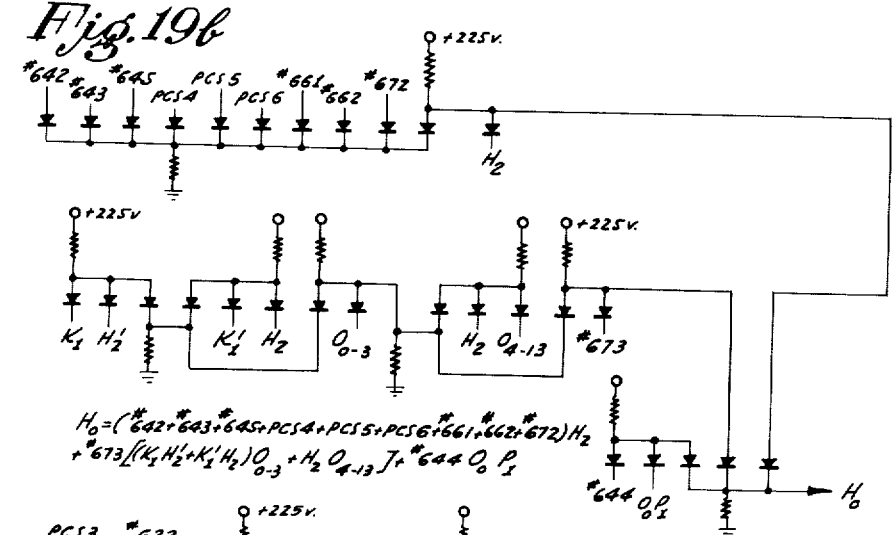

Figs. 19a and 19b show the diode networks for generating the equations for proposition $H_0$ during the "read from tape" and "record on tape" routines, respectively.

Figure 20A:
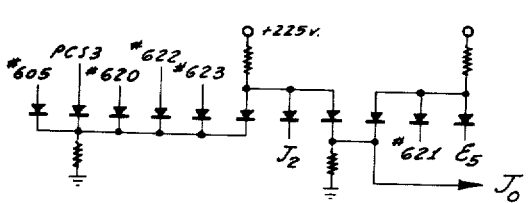
Figure 20B:
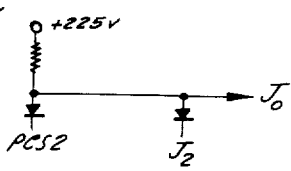

Figs. 20a and 20b show the diode networks for generating the equations for proposition $J_0$ during the "read from tape" and "record on tape" routines, respectively.

Figure 21A:
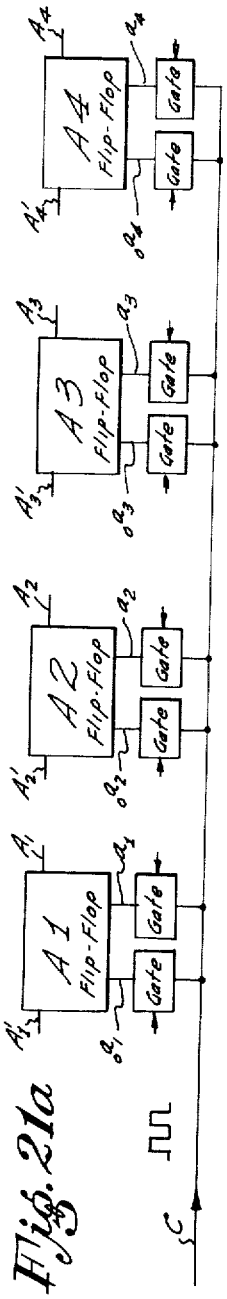

Fig. 21a shows the block diagrams and logical equations for flip-flops A1 to A4.

Figs. 21b and 21c show the triggering diode networks for flip-flops A1 to A4 for the "read from tape" and "record on tape" routines, respectively.

Fig. 22a shows the block diagram and logical equations for flip-flop A5.

Figs. 22b and 22c show the triggering diode networks for flip-flop A5 for the "read from tape" and "record on tape" routines, respectively.

Fig. 23 shows the block diagram, logical equations, and triggering diode networks for flip-flop A6.

Fig. 24 is a table showing the states of flip-flops A7 and A8.

Fig. 25a shows the block diagrams and logical equations for flip-flops A7 and A8.

Figs. 25b and 25c show the triggering diode networks for flip-flops A7 and A8 for the "read from tape" and "record on tape" routines, respectively.

Figure 26A:
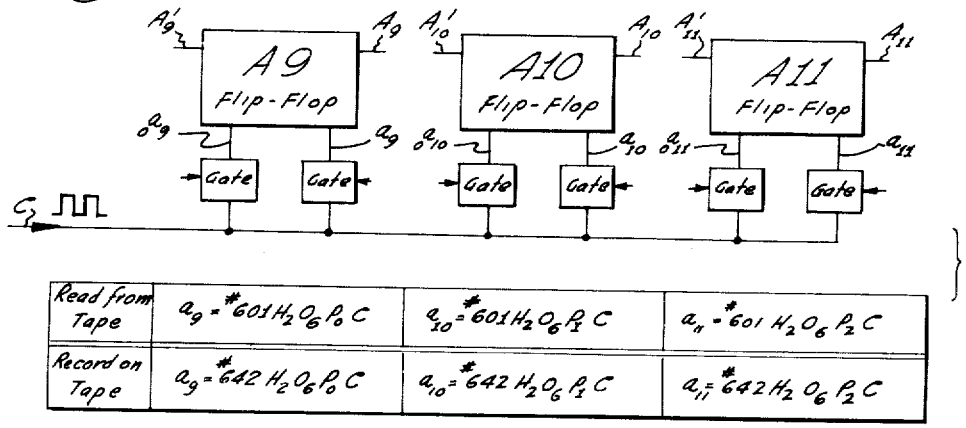

Fig. 26a shows the block diagrams and logical equations for flip-flops A9 to A11.

Figure 26B:
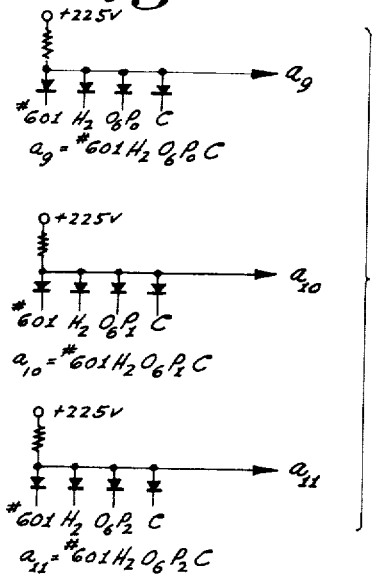
Figure 26C:
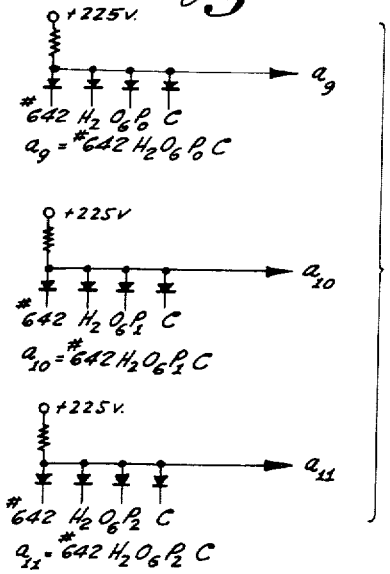

Figs. 26b and 26c show the triggering diode networks for flip-flops A9 to A11 for the "read from tape" and "record on tape" routines, respectively.

Fig. 27 shows the block diagram, logical equations, and triggering diode networks for flip-flop A12.

Fig. 28a shows the block diagram and logical equations for flip-flop A13.

Figs. 28b and 28c show the triggering diode networks for flip-flop A13.

Figure 29A:
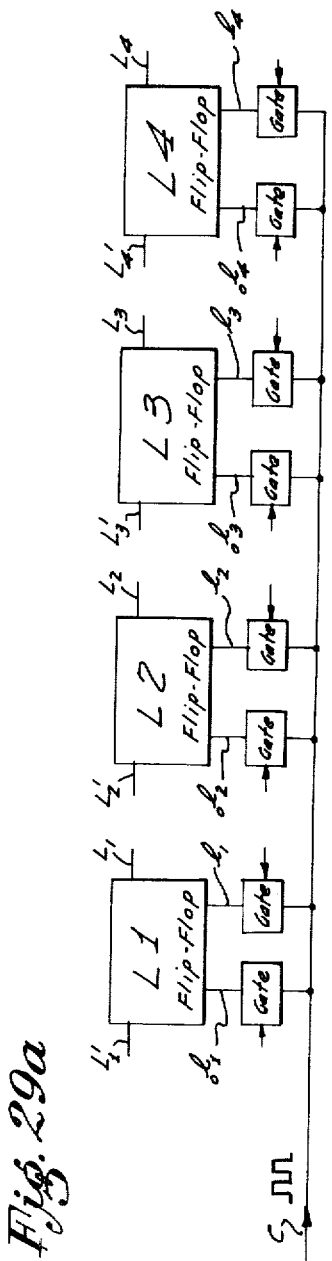

Fig. 29a shows the block diagrams and logical equations for flip-flops L1 to L4.

Figs. 29b and 29c show the triggering diode networks for flip-flops L1 to L4 for the "read from tape" and "record on tape" routines, respectively.

Fig. 30a shows the block diagram and logical equations for flip-flop K1.

Figure 30B:
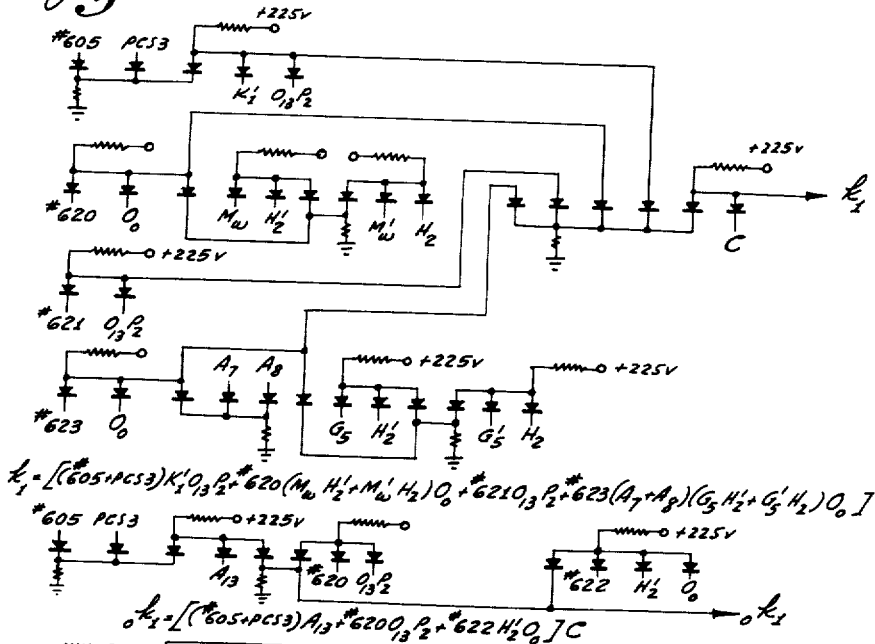
Figure 30C:
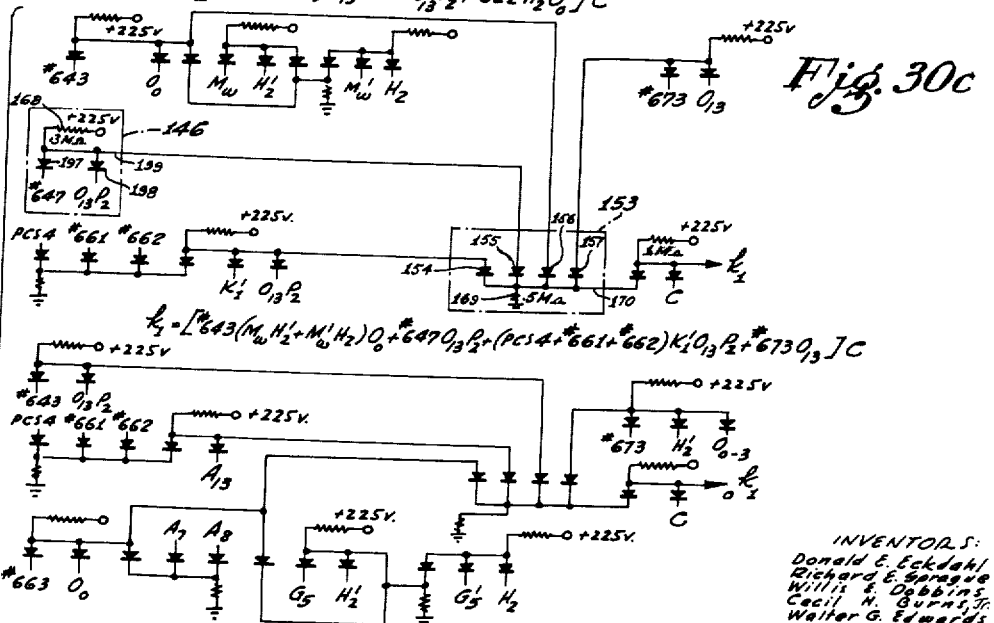

Figs. 30b and 30c show the triggering diode networks for flip-flop K1 for the "read from tape" and "record on tape" routines, respectively.

The invention is herein disclosed with reference to a general purpose computer operatively connected to one or more magnetic tape units, as cited above. It is thus of necessity that frequent mention will be made in this specification to the referenced specifications. This specification and the accompanying drawings will describe and illustrate in detail only such portions of these devices as are directly concerned with the present invention and are necessary to explain the principle and operation thereof, or require modification to provide therefor.

The overall communications system of concern here performs broadly the following operations: (1) selects and makes operative a particular one of a maximum of seven tape units in response to signals from a computer corresponding to information programmed therein, (2) locates any desired portion of the moving tape of the selected tape unit, as identified by address signals also programmed into the computer; and either (3) records in magnetic form, on the selected portion of the tape, information received from the computer in electrical pulse form, or (4) reads to the computer, in electrical pulse form, the information magnetically stored on the selected portion of the tape.

The above operations are performed by the tape unit in response to commands received from the computer. These commands are programmed into the computer and are of three kinds: (1) search for tape address, (2) record on tape, and (3) read from tape. The information in each of these commands will be detailed hereinafter.

As will be made clear in the subsequent description, reading from or recording on a tape is always done with reference to a designated portion of the tape identified by a tape address. Each such address applies to an associated group of information digits magnetically recorded on the tape. The addresses may be any identifying digits the user may wish. For example, the addresses may be in numerical sequence: 1, 2, 3, etc.; the programmer then keeps an index record of the location of various items of information. The addresses might instead represent stock numbers and the associated information digits might contain inventory data on the stock items. In other cases, the address could hold a worker's employee number, and the information on the tape might then be used by the computer to process a payroll. Since the address numbers can be changed as required by the user, it is possible to delete from the tape items no longer needed and add others thereto.

Consequently, prior to reading or recording, a search is made of the tape in motion at high speed to locate the tape address. When the address is found, the motion of the tape is halted and the process of reading or recording is instituted. The tape is then set in motion at low speed and the multiple head of the tape unit is made responsive to information signals either already recorded on the tape or received from the computer. Recording or reading proceeds until one block of tape area has passed the multiple head. Subsequently, if it is desired to continue recording or reading, a further search is made. A presentation of further details of this system will be given later in connection with a discussion of Figs. 2, 12a, 12b, 12c, 13a, and 13b.

Referring to Fig. 1, a perspective view is shown of a computer with provision for the preferred embodiment of the invention.

Here is shown magnetic memory drum 101, supported on suitable arbor mounts 102 and a base plate 103. Drum 101 is rotated in a clockwise direction, as indicated by the arrow on its left end, by motor 104 driving through drive shaft 105. Deposited on the surface of drum 101 is coating 106 of magnetic material, such as ferric oxide, which enables information to be stored as magnetic patterns thereon. Shown stationarily positioned to have a working relation with coating 106 are a plurality of sensing elements, such as head 107, which, as drum 101 revolves, define circumferential channels, such as clock channel 108.

Commencing from the left end of drum 101, the first channel thus defined is designated clock channel 108 and the second channel is designated arc address channel 109. Next on drum 101 are memory channels 111 which function as the source for the computer "words" (as hereinafter described) to be transferred to the magnetic tape, or which function as the repository for the information transferred from the magnetic tape. Toward the right end of drum 101, five more channels are defined on the drum. These channels are different from the others in that only a small arc on each is storing useful information at any given time. Also, this information is stored dynamically in that the moving arc serves as a medium for temporarily delaying information recorded thereon so that it can be picked up a fixed period later. As will be subsequently described, the combination of the delay obtained by this means, together with a delay obtained by a series of flip-flop circuits in arithmetic unit 114 constitute each of the loops referred to as the E, F, G, and H recirculating registers, and the J buffer register. Each of these registers provides means for serially recirculating information through arithmetic unit 114 so that it can be operated upon.

Clock channel 108 completely circumscribes drum 101 and contains a permanently recorded magnetic flux pattern representing an electrical sine wave so as to form a closed loop. Each cycle of this sine wave defines an elemental memory area on the drum periphery on which a binary digit of information may be recorded. Thus the signals on clock channel 108 divide the drum circumference into a fixed number of such elemental areas: namely, 2688 in this computer. Clock head 107 is stationarily positioned close to the periphery of drum 101 and senses the changes in magnetic flux pattern, thereby generating an electrical signal indicative of each sine wave cycle. In construction, clock head 107 is comprised of a split core of soft iron or a like conductor of magnetic lines of force, and a coil wound thereon, in which the electrical waveform is induced as the magnetic flux on drum 101 moves past the core gap. One terminal of the coil is grounded and the other terminal is connected to circuitry designed to shape the induced voltage to a symmetrical square waveform preliminary to causing it to serve as driving voltage for other components. Such circuitry (not shown) is well known in the art and generally comprises several stages of amplification, a pulse shaping circuit, a triggering circuit of the Schmidt type and a diode clamping arrangement. The resulting square wave, hereinafter designated the computer clock signal C, has a period equal to that of the original sine wave and an amplitude clamped between +100 v. D.C. and +125 v. D.C. The time period between trailing edges of computer clock signal C will be designated as a clock period, and a differentiated signal generated by the abrupt fall of the trailing edge of the square wave computer clock signal C is employed to trigger the logical circuitry in the computer. It may be noted that computer clock signal C is also used to synchronize logical networks of arithmetic unit 114. It should be understood that all logical propositions in the computer and the tape units operate at the same two voltage levels as computer clock signal C, i.e., +100 v. D.C. and +125 v. D.C.

It is by utilizing the signals C induced by computer clock channel 108 as a reference during reading and recording that the computer effectively divides the other circumferential channels of drum 101 into a similar number of elemental memory areas and also synchronizes the operation of all circuits so that they operate in accordance with a basic timing logic. Each of these elemental memory areas on the periphery of drum 101 in the other channels shown in Fig. 1 is capable of containing a digit of binary information, i.e., a saturated flux pattern either in one direction or the other. When the flux is in one direction in a given elemental memory area, a binary digit "one" is represented; when it is in the other direction, a binary digit "zero" is represented. Since the non-return-to-zero method of storing information on the drum is employed, the recorded flux pattern changes for successive memory areas only when the binary digits of a sequence change from 0 to 1, or vice versa.

Computer components are designed to serially handle information in groups consisting of a fixed number of binary digits. These groups may represent either commands or numbers and are commonly referred to as "words." A word is comprised of a sequence of 42 consecutive binary digits and thus requires 42 consecutive memory areas for storage. The portion or arc of a circumferential channel in which a word may be recorded is designated a storage register. Since clock channel 108 contains 2688 computer clock signals, storage space or registers for 64 words (2688/42) are provided on each of the channels. Thus the circumference of drum 101 is divided into 64 arcuate registers. As shown on the left end of drum 101 in Fig. 1, each of these registers is designated by one of the reference numerals 0 through 77 (the computer and tape units employ the octal numbering system). The arcs are numbered consecutively in a counterclockwise direction, and it should be noted that arc 77 is followed directly by arc 0 such that the defined registers extend over the entire circumference of the drum. The time required for one arc to pass a head is designated as one word period, which is defined by 42 cycles of the sine wave passing clock channel head 107.

In order to enable arithmetic unit 114 to properly respond to each of the digits in a register being sensed at any given time, counting circuits comprised of P counter 117 and O counter 118 are provided for counting the computer clock pulses generated by clock head 107 and its associated circuitry. These counters, together, respond to a cycle of 42 clock pulses. Thus the overall counting cycle defines the period allotted to a register on the drum. P counter 117 responds directly to the signals induced in the clock head 107 and has a capacity of three clock pulse counts, namely, $P_0$, $P_1$, and $P_2$. A carry pulse generated once each cycle of P counter 117 causes O counter 118 to manifest a new count. Since the unit to which O counter 118 responds is represented by a period of three clock pulses, it can be thought of as counting or defining octal digits. It is well known in the computer art that a group of three binary digits together can be readily converted into their octal equivalent. This arrangement of counters divides each register into 14 octal digits; namely, $O_0$, $O_1$, . . . $O_{13}$, as manifested by signal outputs from O counter 118. Accordingly, by noting the counts in the P and O counters together, succeeding elemental memory areas on the arc, hereinafter to be designated "binary digit positions" or "pulse positions," are identified by the P and O counters as $O_0P_0$, $O_0P_1$, $O_0P_2$, $O_1P_0$, . . . $O_{13}P_2$. In summary, each word period is divided by this arrangement into fourteen O (octal) periods, each of which is subdivided into three P (binary) positions and in each of the latter may be stored one binary digit of a binary-coded octal digit. Accordingly, by noting the counts of the P and O counters, the pulse position in an arc, or storage register, presently being scanned by the heads on drum 101 can be observed.

The means employed in the P and O counters to define any pulse position or combination of pulse positions of a word, so that circuitry in arithmetic unit 114 may be arranged to provide proper triggering for flip-flops as required by their respective equations, is well understood in the prior art. Thus, considering P counter 117, Fig. 1 indicates that two flip-flops, B1 and B2, are employed. The arrangement is a parallel one in that computer clock signal C is simultaneously applied to all gates associated with the inputs to these flip-flops. The interconnection of the outputs of these flip-flops to the inputs thereof causes them to be triggered by successive computer clock pulses to indicate the P cyclical counts $P_0$, $P_1$, and $P_2$. The arrangement for O counter 118 is similar, and each of the counts $O_0$, $O_1$, . . . $O_{13}$ represents a different combination of states of flip-flops D1 through D4. Thus, depending upon the binary digit position of an arc to be represented, a particular configuration of each of the two flip-flop groups B1–B2 and D1–D4 is routed to arithmetic unit 114 during each computer clock pulse period, effectuating a different arrangement in a matrix type of diode network, the effective output of which is then used as an input to logical gates or mixers.

The configuration of computer words will next be discussed as preliminary to a description of the other channels of drum 101.

Referring to Fig. 3a, a diagram showing the serial arrangement in a word period of information will be described. The word period of 42 clock periods is shown to be divided into 14 equal octal digit periods. Starting from the right, these periods are marked $O_0$ through $O_{13}$, respectively. Each of these octal periods is further divided into three binary digit positions marked $P_0$, $P_1$, and $P_2$. Thus the present computer can provide for operating on binary numbers with a maximum length of 42 digits; however, the maximum length of a number in the computer is set at 41 digits, for reasons not relevant here. It may be noted that a number is arranged in the word with its least significant binary digit to the right and the most significant binary digit to the left. Thus the $O_{13}P_2$ position of a number always contains a binary digit zero and, as will be shown, provision is not made for its transfer in the recording or reading processes.

In Fig. 3a, the specific word arrangement shown is the representation of the command "search for tape address." In Figs. 3b and 3c, for which it should be noted that the word diagrams are divided into periods defined by the O and P counts, similarly to that in Fig. 3a, the representations are for the commands "record on tape" and "read from tape," respectively. For the application of the present invention, the information in a command consists generally of a code which defines an instruction, a code which identifies one of seven tape units operable by the computer, a code prescribing a tape address to be sought, a code which prescribes one of three operating modes of recording on or reading from the tape, and a code which prescribes the first address in an eight-word recirculating register (the J buffer register as hereinafter described). This latter register is involved in the transfer of information between computer and tape unit. As shown in the commands of Figs. 3a, 3b, and 3c, the instruction code occupies periods $O_{12-13}$ and the tape unit selector code occupies period $O_6$; in the commands of Figs. 3b and 3c, the operating mode code occupies period $O_4$ and the code for the address in the J buffer register occupies period $O_0$; and in the command of Fig. 3a, the block address code occupies periods $O_{0-4}$. It may be noted that in the present embodiment of the invention, the address in the J register first to transfer a word to the tape during the recording process is address 0; thus the code programmed into period $O_0$ of Fig. 3b is zero.

With reference to the command code for tape address, it is noted that Fig. 5 presents a drawing of a section of the magnetic tape (Fig. 1), differing in minor details only from that of the referenced application, Serial No. 462,752, and shown in Fig. 2 thereof. These differences are the provision for recording up to 16 words per block (exclusive of blank area word $W_s$ and word $W_0$), the substitution of the nomenclature $D_0, D_1, \ldots D_{10}, D_b$ for digit positions $P_0, P_1, \ldots P_{10}, P_b$ (to avoid confusion with computer pulse positions $P_0, P_1,$ and $P_2$) and the repositioning of the block address from digit positions $P_{2-5}$ to digit positions $D_{3-6}$ to provide symmetry between the decimal (4 binary digit) system in accordance with which the tape is recorded and the octal (3 binary digit) system of the computer. It is also to be noted that the symbol for tape unit clock pulses is designated in the present specification as $C_t$ (the designation C will be reserved herein for computer clock pulses).

Referring next to Fig. 4, a diagram of a portion of arc address channel 109 (Fig. 1), defining in particular arc 0, is shown. In periods $O_{0-1}$, $O_{4-5}$, and $O_{8-9}$ (as noted in Fig. 3a) of each of the arcs in arc address channel 109, signals corresponding to the binary number indication of the address of the next arc to pass the heads 127 of memory channels 111 are permanently recorded. As will be detailed later, the binary digits read from arc address channel 109 are serially set up in flip-flop Mw (Fig. 7). It should be noted that the details of the circuitry for serially triggering flip-flop Mw, in accordance with the magnetic pattern on arc address channel 109, has already been disclosed in the art. Briefly, the binary square wave pattern impressed in arc address channel 109 (Fig. 1) is sensed by head 126 and, due to differentiation thereby, presents pulses representing the leading and trailing edges of a square wave. These pulses are amplified, clipped, clamped between the limits +100 v. D.C. and +125 v. D.C., and applied to the grid input circuits of flip-flop Mw through a diode gate such that the leading-edge pulse triggers flip-flop Mw into one state and the trailing-edge pulse triggers flip-flop Mw into the opposite state. The grid input circuit diode gates of flip-flop Mw are synchronized with the computer clock pulses by application of computer clock signal C. These concepts will be further clarified later in connection with the convention adopted to present the computer logic. The output of flip-flop Mw provides one of the inputs to diode network 125 of arithmetic unit 114, as will also be shown hereinafter.

Next in order from the left of drum 101 are memory channels 111. Each of these channels is equipped with a stationary memory head 127, used for both reading and recording. Since information is always recorded into an arc of the main memory by reference to the O and P counter signals, the information recorded in a storage register of memory channels 111 is always temporally aligned with the periods of the arcs already shown to be defined on drum 101 by arc address channel 109. As shown, information sensed by head 127 is supplied to gating circuits 167 which control the connections thereof, permitting only one memory channel to communicate with arithmetic unit 114 at a time. Gating circuits 167 operate in accordance with well established principles as fully discussed in the referenced application, Serial Number 325,144.

Still referring to Fig. 1 and to the recirculating registers E, F, G, and H and the J buffer register more particularly, it is noted that each of these recirculating registers has two heads associated with the drum memory, one for reading and the other for recording, arranged such that as drum 101 rotates, a portion of the drum surface will pass the record head first and the read head later. For example, the E register includes a record head 112 spaced along the drum surface from a read head 113. Thus, as far as the recirculating registers are concerned, only a small arcuate portion of the drum surface is used for storing information at a given time. This portion occupies an area equivalent to less than 42 elemental memory areas, in the case of the E, F, G, and H registers, and the information is delayed in arithmetic unit 114 a given number of clock periods so that the normal recirculating time for each of these registers is 42 clock periods, i.e., one word period. The recirculating registers have their heads interconnected by way of the arithmetic unit 114 so that, for example, when the computer circuitry is set for recirculation in the E register, a particular binary digit signal on being recorded on the drum surface by record head 112 will be carried by the revolving drum 101 to read head 113, sensed thereby, transmitted to arithmetic unit 114 wherein the signal steps through flip-flop circuits, and is then retransmitted to record head 112 by which it is again recorded. As stated, the design of the computer is such that the total time required for a particular digit to make one such cycle in each of the recirculating registers during normal recirculation is equal to one word period. This is true even if this digit undergoes a modification in arithmetic unit 114. In a similar fashion, for the J buffer register, the portion of drum 101 used occupies an area equivalent to several elemental memory areas less than 8 word periods, and the information is delayed in arithmetic unit 114 a given number of computer clock periods so that the normal recirculating time for this register is 8 word periods or 336 clock periods.

It should be understood that the read and record circuitry for the recirculating registers is well understood in the prior art; thus it will not be repeated here.

Referring now to Fig. 7 more particularly, a schematic diagram is shown of the relation of arithmetic unit 114 to other components of the computer relevant to the invention. Arithmetic unit 114 is comprised in the main of a diode network 125 which operates to interconnect the flip-flop circuits of the computer to route information and to perform digital processes on the information in accordance with specified sequencies. As noted, the flip-flop circuits are the source of the binary terms which make up the logical equations by which computer operations are represented.

Flip-flops Er, Fr, Gr, Hr, and Jr are integrally parts of the E, F, G, and H registers and the J buffer register, respectively, and respond to propositions $E_0, F_0, G_0, H_0,$ and $J_0$ from diode network 125. These flip-flops serve to reconstruct and synchronize the signals derived from diode network 125 before recording them back onto drum 101.

Flip-flops E1, G1, F1, H1, and J1 are also parts of the E, F, G, and H registers and the J buffer register, respectively, and operate such that their outputs directly follow the information read from their respective channels on drum 101.

Flip-flops E2 to E5, F2, G2 to G5, H2 and J2 are also parts of their respective registers and serve to step information along to diode network 125 such that, during normal recirculation, the information in one flip-flop of a chain at any one clock period is shifted to the next flip-flop in the chain at the end of each clock period. The concept will be discussed further when the process of shifting information in the E register is described. It is to be noted here, however, that these flip-flops serve to give the recirculating registers a degree of flexibility in that, for instance, information can be routed directly from them into diode network 125 by way of their outputs. As shown in Fig. 7, an example of such a connection is provided by line 116 which routes the outputs of flip-flop E1, namely, $E_1$ and $E_1'$, into diode network 125 (terminology to be explained later).

Flip-flop M1 operates to feed information from memory channels 111 into diode network 125 in accordance with well-known methods.

As will be subsequently described, the primary function of flip-flop K1 is to signal program counter 115 at the end of each word period to "count" to its next higher number, "skip" to a new number, or "stick" in the same number.

Flip-flops A1 to A4 function in the present invention as a storage register for signals corresponding to four binary digits to be transferred between the computer and a tape unit. This register acts as an intermediary between input-output register L1–L4 (see below), which receives and transmits signals simultaneously (i.e., in parallel) and the E register which receives and transmits signals one at a time (i.e., serially).

The function of flip-flop A5 is generally to indicate whether diode network 125 is to be arranged to provide for recirculation of information in the E register or to provide for shifting of information in the E register.

Flip-flops A6 and A12 operate together to identify and indicate addresses in the J buffer register.

Fip-flops A7 and A8 operate to indicate to the tape unit which one of the three operating modes, as previously mentioned, is to characterize the tape reading or recording operation.

Flip-flops A9 to A11 act, in a broad sense, as a gate set up to correspond to the code which directs the selection of a particular one of the maximum of seven tape units operable with the computer.

Flip-flop A13 is involved in the synchronization of computer operations with tape unit operations, and will be further discussed in the ensuing description.

Flip-flops L1 to L4 function as a storage register connected directly to the tape units, serving to store signals corresponding to four binary digits to be transferred. It should be understood that the information picked up from, for example, the channel of the E register on drum 101 by flip-flop E1 is synchronized with computer clock periods. This information, on successive computer clock pulses, is stepped along through flip-flops E1 to E5 and is supplied to diode network 125, which, in response to this output as well as to other sources of two level potential shown feeding thereinto, generates outputs, one of which, $E_0$, is stepped into flip-flop $E_r$ and thence back onto drum 101. After the delay, depending on the spacing of record and read heads 112 and 113, respectively, on drum 101, this information again appears in flip-flop E1. The loop thus defined represents a delay of one word period in the case of the recirculating registers, and 8 word periods in the case of the J buffer register. It is to be noted that each word period of recirculation of the J buffer register may be identified by timewise reference to the least significant octal digit of the arc address to which flip-flop Mw responds. Thus, words of the J buffer register may be considered to be addressed with the addresses 0 to 7, inclusive. It is further noted that during recirculation, information in the J buffer register passes through arithmetic unit 114 eight times for each revolution of drum 101.

Fig. 7 also indicates that information may be received by diode network 125 in the form of signals on lines $T_1$, $T_2$, $T_3$, $T_4$, and the tape unit clock signal $C_t$, from a tape unit as the magnetic tape thereof is being read. The nature and origin of these signals have been well recited in the application, Serial Number 462,752, already referenced.

Also shown in Fig. 7 are four sets of signals directed to all tape units. Signals on lines $L_1$ to $L_4$, during the "record on tape" routine, present the information to be recorded on the tape; signals PCS1 and PCS2 (the equivalent of signals $R_2$ and $W_2$, respectively, of the tape unit R link) energize the relays of the tape unit which connect lines $L_1$ to $L_4$ to the tape unit recorder during the "record on tape" routine or connect lines $T_1$ to $T_4$ to the tape unit reader during the "read from tape" routine; signals $A_7$ and $A_8$ which act to select the appropriate operating mode and feed into the tape unit register; and signals $A_9$ to $A_{11}$ which function to select a particular tape unit via unit selector circuits 182. Further discussion of these outputs is reserved for a later time in connection with Figs. 2, 12a, 12b, 12c, 13a, and 13b.

In the present computer, the processes performed are divided into sequential operations, each requiring a time period of one word length. It is the function of program counter 115 to render certain networks operable during each word period so as to accomplish each of these step operations. Accordingly, each output count signal, #0, #1, etc., of program counter 115 selects, i.e., renders operable, certain circuits of diode network 125 which respond to the desired inputs during each of the 42 clock periods of a word to generate the desired output propositions.

The cycle of 42 clock periods comprising a word period is determined by the timing circuits feeding into the left of diode network 125. These circuits include the computer clock pulses C, signals from O counted 118, and signals from P counter 117. The counter outputs operate to break up the period of a word to render certain circuits effective only during certain portions of the word. In this way, the coded information in various positions of a word can be operated upon according to its significance.

The content of program counter 115 is changed precisely at the end of each word period, as directed by the state of flip-flop K1 during the last binary digit position of each word period ($O_{13}P_2$), to cause other diode network circuits to become operable during the next word period. Thus Fig. 7 shows that program counter 115 feeds its outputs into diode network 125 and is in turn controlled by output 130 (from flip-flop K1) controlled by diode network 125. Reference to Figs. 12a, 12b, and 12c will clarify the action of the program counter 115. These figures present the portion of the computer flow diagram relevant to the process of recording on the magnetic tape of a tape unit and show how the step operations are arranged in sequence to accomplish this routine when the coded command "record on tape" (Fig. 3b), programmed into the computer by the operator, is being performed. As noted in Figs. 12a, 12b, and 12c, each of the step operations is represented in the flow diagram by a block of program counter 115 identified by a number, such as PC#643. Each such block represents diagrammatically a set of logical operations to be performed serially by diode network 125 on information passing through arithmetic unit 114 during a single word period. The flow diagram extract shows the sequence in which program counter 115 changes in content, thus automatically directing the order in which the one-word step operations are performed by the computer. The one-word step operations may repeat for several word times, depending on a binary decision; or one or another sequence may be carried out after a certain operation in a previous sequence causes a binary choice to be made. Generally, program counter 115 increases in content or "counts" (octally in this computer) in an orderly fashion as the one-word operations are sequenced from left to right on the flow diagram; an example is horizontal output 129 from PC#642 to PC#643 in Fig. 12a. However, program counter 115 may have the same number content for more than one word, i.e., program counter 115 may "stick" in a given number as indicated, for instance, by a vertical output such as represented by line 131 associated with PC#643. Furthermore, program counter 115 may "skip" from one PC# to another, as indicated, for example, when it skips from PC#673 to PC#650 via the vertical output represented by line 132.

It is the state of flip-flop K1 (Fig. 30a) at the end, or $O_{13}P_2$ position, of a word period, that determines which of the two courses (horizontal or vertical) program counter 115 will follow when computer clock pulse C falls at the end of pulse position $O_{13}P_2$. In the present computer, if flip-flop K1 is false at $O_{13}P_2$, program counter 115 will count; if flip-flop K1 is true at $O_{13}P_2$, program counter 115 will stick or skip. The state of flip-flop K1 at $O_{13}P_2$ is the result of a number of conditional processes, one of which occurs during every word period and which will be presented for exemplary word periods.

With reference to Fig. 1 again, the circuitry corresponding to a particular count of program counter 115, as is well known in the art, is made effective in accordance with the states of the flip-flops N1 through N8 in accordance with the various functions to be performed. Triggering for the grids of these flip-flops is controlled by flip-flop K1 and the outputs of these flip-flops (which indicate PC#s) are fed into diode network 125 (Fig. 7). Since flip-flop K1 is controlled in turn by circuitry of arithmetic unit 114, it is apparent that mutual control occurs between program counter 115 and arithmetic unit 114.

Before considering further features of the computer circuitry concerned with the present invention, the convention of the logical methods employed herein will first be broadly outlined.

Logical propositions may be considered to be represented in circuitry by the states assumed by flip-flop circuits having two input lines and two output lines, as illustrated by the arrangements of Figs. 8 and 9. This circuit is designated as flip-flop K1 and its function in the circuitry of the present invention will be described hereinafter. This flip-flop circuit utilizes a pair of triode tubes such as tube 134 and tube 135. When the flip-flop is in the condition such that tube 135 is cut off and tube 134 is conducting, it is considered to be "true" (or the flip-flop is said to be storing a binary "1"). When the flip-flop is in its other condition wherein tube 135 is conducting and tube 134 is cut off, it is considered to be "false" (or the flip-flop is said to be storing a binary "0"). It is thus understood that a flip-flop is generating two terms. These terms are represented by the flip-flop output lines which are connected to the plates of the tubes and which are shown clamped at two operating potentials, +125 v. D.C. and +100 v. D.C. When the flip-flop is in a true state, the output line connected to tube 135 is at +125 v. D.C. while the output line connected to tube 134 is at +100 v. D.C. Similarly, when the flip-flop is in a false state, the output line connected to tube 134 is at +125 v. D.C., and the output line connected to tube 135 is at +100 v. D.C. In order to trigger the flip-flop, signals in the form of negative-going pulses are applied thereto on separate input lines coupled to the grids of the flip-flop tubes in accordance with the convention that the grid of tube 135 must be pulsed in order to trigger the flip-flop into its true state, and that the grid of tube 134 must be pulsed in order to trigger the flip-flop into its false state.

The nomenclature employed herein uses the combination of a capital letter followed by a numeral or lower case letter for designating a proposition flip-flop (K1, Mw, etc.). The output of the flip-flop, which is at the high D.C. voltage (+125 v.) when the proposition is true, is characterized by the corresponding capital letter with the numeral or lower case letter as a subscript ($K_1$, $M_w$, etc.); and the output which is at the high D.C. voltage when the proposition is false is similarly characterized except that a prime is affixed ($K_1'$, $M_w'$, etc.). The true input of the flip-flop, i.e., the one which, when energized, renders the proposition true, is characterized by the corresponding lower case letter with the associated numeral or lower case letter as a subscript ($k_1$, $m_w$, etc.); the false input, i.e., the one which, when energized, renders the proposition false, is characterized similarly except that a subscript zero is prefixed ($_0k_1$, $_0m_w$, etc.).

Describing the circuit of flip-flop K1 of Figs. 8 and 9 in greater detail, as shown, the input to the grids of triodes 134 and 135 is from gating circuits 140 and 141, respectively, during, for instance, PC#643 of Fig. 12a.

As previously pointed out, the flip-flop circuit is triggered into its opposite state by applying a negative pulse to the grid of the conducting tube. If, for instance, the term $K_1$ is to be effective, it is necessary that the plate of triode 135 be high in potential. For this condition to attain, triode 135 must be cut off. Thus it is necessary to apply a negative pulse to the grid of triode 135 by providing an output from gate 141 (i.e., all of the input signals representative of terms $$(M_wH_2' + M_w'H_2)$$

$O_0$, and C must be simultaneously at the high potential of +125 v. D.C.). At the end of the pulse period, the clock pulse will abruptly drop to the ineffective potential +100 v. D.C., which change in potential, after differentiation, will produce the requisite negative-going pulse. It follows that flip-flop K1 will enter period $O_1$ in a true state. It should be noted that, if flip-flop K1 were already true during $O_0$, triode 135 would already be cut off and the negative pulse supplied by gate 141 would have no effect. In this case, the only way to change the state of flip-flop K1 would be to pulse the grid of triode 134 by providing an output from gate 140.

For the presentation of other flip-flop circuits, resort will be made to block diagrams to represent the schmatic form, as illustrated by Fig. 8 for flip-flop K1, and the logical equations which define when and how the flip-flop circuit is to change will be shown below the block diagram. It will be noted that, for simplicity, the program counter terms effective for the $k_1$ and $_0k_1$ equations used as illustrative of nomenclature have been omitted.

The action of flip-flop K1 in accordance with the equation shown will be further explained by the waveforms of Fig. 10. These graphs show how flip-flop K1 is triggered false from a prior false pulse condition at the end of period $O_{13}$ as the result of equation $_0k_1 = O_{13}P_2C$ (Fig. 8). Line I represents computer clock signal C. Line II shows the states of P counter 117, which defines the period $P_2$ during which diode network 125 is arranged by program counter 115 to make flip-flop K1 responsive to clock signal trigger pulses which will take effect provided the state of O counter 118 is such that the period $O_{13}$ is defined. In line III this provision is shown to be met. It is thus at $O_{13}P_2$ only that an effective false input $_0k_1$ (line IV) will be generated. However, flip-flop K1 will be triggered false only by a negative-going pulse applied to its false grid. This pulse occurs, as shown in line V, when the $_0k_1$ input sharply drops to a low potential at the end of $Q_{13}P_2$. Thus, as line VI shows, the output $K_1'$ swings to a high potential at $Q_0P_0$. It is noted that flip-flop K1 will remain in the false state until triggered in accordance with the $k_1$ equation of Fig. 8.

As previously stated, the computer logical operations are represented in the form of logical equations using the notation of Boolean algebra. A logical equation for the grid triggering of a flip-flop circuit consists of stating the terms which have to be effective, i.e., of a high potential during a clock period, in order that the flip-flop circuit will trigger into a particular state at the end of the clock period. Two operations are used in forming the equations. The first, "logical multiplication," means that all the terms in the particular product have to be of a high potential in order to make that product effective in a particular equation, and is accomplished in a circuit known as a logical product network (gate). The second, "logical addition," means that at least one term of the sum has to be of a high potential in order to make that sum effective in a particular equation, and is accomplished in a circuit known as a logical sum network (mixer). Logical product and sum networks will next be described by reference to Fig. 30c which shows, for the "record on tape" routine, the complete triggering equations, block diagram, and circuitry for flip-flop K1. Thus, for example, the equation effective during PC#643:

$$k_1 = (M_w H_2' + M_w' H_2) O_0 C$$

is interpreted as meaning that flip-flop K1 will be triggered into the true state at the end of the clock period during which the terms $(M_w H_2' + M_w' H_2)$ and $O_0$ are at a high potential, where $(M_w H_2' + M_w' H_2)$ itself will be at a high potential whenever both the terms $M_w$ and $H_2'$, or both the terms $M_w'$ and $H_2$ are simultaneously of a high potential.

Fig. 30c shows the logical product networks such as 146 and logical sum networks such as 153, which are used to generate the trigger equations for flip-flop K1. The principles in accordance with which these networks are designed and operated are considered to be well known to the art, and have been well elucidated in the aforementioned referenced application, Serial Number 325,144.

Briefly, the portion of the diode network enclosed within block 146 is a typical product, i.e., "and" network. In such a circuit, signals having voltage levels of either +100 or +125 are obtained from the sources indicated and applied on the cathode-ends of crystal diodes, such as 197 and 198, whose anode-ends are joined to common line 199 connected to positive source +225 v. through product resistor 168.

Any time all the diode input signals to product network 146 are at the high potential of +125 v., the output on line 199 swings to this high potential. If any one of the input signals is at the low potential of +100 v., the output on line 199 is at this low potential because of the current flow through resistor 168.

Output line 199 is connected as one of the inputs of a typical sum, i.e., "or" network, enclosed within block 153. This logical sum network is comprised of four input diodes 154, 155, 156, and 157 whose cathode-ends are joined to common line 170 and returned to ground through sum resistor 169. The input signals to this circuit are applied on the anode-ends of the diodes. Whenever any one of the inputs to logical sum network 153 is at the high potential of +125 v., the current flow through sum resistor 169 causes output line 170 to swing to the high potential +125 v.

It is also evident that output line 170 is connected as an input to a further logical product network, and the output of the latter is the term $k_1$, which, as mentioned, drives the true grid of flip-flop K1.

Specific reference to Fig. 2 will next be made as an introduction to a detailed description of the "record on tape" and "read from tape" routines. Fig. 2 presents a block diagram showing the cooperative relation of the components making up the system of the invention. Provision is made here for indicating the flow of information between memory channels 111 of the computer and the magnetic tapes of the tape units.

As an example, in the process of "recording" information on a tape, it is expedient to assume that a block search has been completed, that information, stored in memory channels 111 in the form of a plurality of computer words, has been selected and a maximum of 8 of these words have been transferred to reserve register 172 (comprised in the main of the J buffer register already described) for recirculation, and that the computer flow has proceeded through a process of identification of the command "record on tape" and, by virtue of the construction of the command, has been sequenced to enter word block PC#642. Here, as will be detailed later, tape unit selection circuits 178 function, via unit selector circuits 182, to make operative the tape unit specified by the command (the same tape unit that was searched); mode selection circuits 179 cause the tape unit register A7, A8 to retain the mode selection code of the command; and record-read selection circuits 183 function, also via unit selector circuits 182, to connect lines $T_1$ to $T_4$ (which carry the outputs $L_1$ to $L_4$ of input-output register 177) to the R link of the tape unit, and thence to the recorder of the tape unit.

As shown in Fig. 2, the word stored in address 0 of reserve register 172 (as specified in the "record on tape" command, Fig. 3b), is then transferred, as represented by line 119, directly to transfer register 175 and time marker 173 notes the word period of this transfer. During the next word period, the word from address 1 of reserve register 172 is transferred, as represented by line 121, to interim register 174. During subsequent word periods, the content of transfer register 175 in sections of four binary digits, is shifted and fed, via lines 122, to intermediate register 176, thence via lines 123 to input-output register 177, and thence, as synchronized, via line 128 with tape clock signal $C_t$ received by synchronization circuit 184, to lines $T_1$ to $T_4$ by which they are conveyed to the tape units. When transfer register 175 has been emptied, a test is made to determine, from the operating mode code or the content of time marker 173, whether further recording is to be made. If the operating mode code directs the recording of the block address word only, or if the content of time marker 173 indicates that all words of reserve register 172 have been recorded, the test results in a signal which sequences the computer to the next command in its program. However, if neither of these alternatives are indicated by the test, the recording is continued as follows. The word in interim register 174 (i.e., the word originally in address 1 in the J buffer register) is transferred via line 124 to transfer register 175 and recorded as was the previous word. The word of address 2 in the J buffer register is located by time marker 173 and fed to interim register 174. Upon completion of recording of the word previously of address 1 in the J buffer register, a test as before is made. The test now will indicate that further recording is required, since the routine provides only for recording 8 words. Thus, the process is repeated until the word of address 7 in the J buffer register is recorded, after which the test will indicate that no further recording is required and the computer will sequence to a routine which will select the next command in the program for execution.

With regard to reading information into memory channels 111, the assumptions to be made in connection with Fig. 2 are that a block search of a tape unit has been completed, that the block contains information which is to be transferred and that the computer flow has proceeded through a process of identification of the command "read from tape" and, by virtue of the construction of the command, has been sequenced to enter the word block PC#601. Here, tape unit selection circuits 178 function, via unit selector circuits 182, to make operative the tape unit specified by the command (the same tape unit that was searched), mode selection circuits 179 cause the tape unit register to retain the mode selection code of the command and record-read selection circuits 183 function, also via unit selector circuits 182, to connect the outputs of the multiple head of the chosen tape unit to the reader thereof, thence to the R link and finally to lines $T_1$ to $T_4$ which connect to the inputs of input-output register 177.

Although for clarity, the flow of information for the "read from tape" routine is not shown in Fig. 2, it should be noted that each word received from the tape unit is fed to input-output register 177 in sections of four binary digits and in synchronization via line 128 with tape clock signal $C_t$ received by synchronization circuit 184. Subsequently, transfer of this information is made to intermediate register 176 and from there to transfer register 175, which shifts content to provide for the receipt of incoming digits and recirculates until a word of information has accumulated therein. Subsequently, the address in the J buffer register (as specified in the "read from tape" command, Fig. 3c) is looked up and, when found, the content of transfer register 175 is introduced therein and the word period of this occurrence noted by time marker 173. During succeeding word periods, a test such as already mentioned is conducted, and if tape words in addition to the block address word are to be read, the process is repeated until the J buffer register is filled, as will be indicated by time marker 173. If the J buffer register is filled or if only the block marker word is to be read, the computer is sequenced out of the "read from tape" routine and is directed by another command to a routine which empties the content of the J buffer register into designated storage registers of memory channels 111.

More particular reference will next be made to Figs. 12a, 12b, 12c, 13a, and 13b, which are extracts of the computer flow diagram relevant to the processes of the present invention. These figures show how the step operations rendered effective by program counter 115 are arranged to select and control a tape unit for purposes of recording information on a magnetic tape and reading information recorded on a magnetic tape. As the figures indicate, within the rectangle representing each word time block, concise statements appear defining the activity during that word period. Below each of the blocks, logical equations are presented which define how the statements made within the rectangle are precisely stated in terms of the computer logic. It should be pointed out that not all of the propositions previously noted in connection with Fig. 7 as being generated by arithmetic diode network 125 are needed in order to accomplish the operations performed during a word period. Thus, equations are listed below each word block for only those propositions which are effective during the word period of a block. In the subsequent description, it may be considered that if one of the propositions shown feeding out of the right of diode network 125 of Fig. 7 is not generated during a word period, it is equal to zero, i.e., ineffective, for that word period.

It will be seen that certain operations and, therefore, certain forms of the logical equations occur in more than one word time block. As described, the scheme of the present invention provides circuitry for physically generating logical products and logical sums. Thus, by mere reference to an equation, the arrangement of the circuitry for generating the equation can be set up directly. However, it is not necessary for a logical combination of terms to be generated more than once. Thus, when a particular equation is used in several word time blocks, it is only necessary to provide circuitry for generating this equation once, and then to logically multiply the output with the PC#s which define when it is to be operative. The simplification of the equations, and, therefore, diode networks by this means results in a reduction of the number of terms and components required. Thus, it is seen that the equation $J_0=J_2$ occurs for every PC# block in Figs. 12a, 12b, and 12c. The PC#s for these blocks are logically summed by the diode networks shown in Fig. 11, generated as separate functions and designated simply as PCS2 (program counter sum 2). This function is employed as an input to the logical gates or mixers represented by the appropriate equations.

In the discussion of Figs. 12a, 12b, 12c, 13a, and 13b that follows, this simplification will become evident if reference is made, where desired, to Figs. 11, 16 through 23, and 25a through 30c, which show all diode networks, block diagrams, and logical equations for generating the logical propositions relevant to the invention.

Referring to Fig. 12a, it is first noted that entrance to the "record on tape" routine is made, as aforementioned, from a routine which identifies the corresponding command (Fig. 3b), and which sequencies the computer into block PC#642. It is to be noted that PC#642 is one of the blocks of PCS2 (Fig. 11) and thus output line PCS2 from record-read selection circuits 183 (Fig. 2) to unit selector circuits 182 (Figs. 2 and 15) is at the high (effective) potential of +125 v.

The first statement made in PC#642 is that the H and J buffer registers are recirculated, represented by the equations $H_0=H_2$ and $J_0=J_2$. The content of the J buffer register, it will be recalled, comprises the words selected from memory channels 111 to be recorded on tape; the content of the H register comprises the "record on tape" command, introduced into the H register during the command identification routine. It will be noted that these equations are operative during the entire word period. Where such is the case, the timing term $O_{0-13}$ will not be included. It will also be noted that, for simplicity, the PC# during which the equation is effective has been omitted from the equation, although the PC# appears as a logical multiplier in the appropriate diode networks shown in the drawings.

Next in block PC#642 it is stated that flip-flops A7 and A8 of mode selection circuits 179 (Figs. 2, 25a, 25b, and 25c) are set to the $O_4P_{0-1}$ content of the H register. More specifically, the equations $A_7=O_4P_1H_2C$ and $A_8=O_4P_0H_2C$ set up flip-flops A7 and A8 to correspond to the code for the mode of operation (discussed in connection with Figs. 3b and 3c).

In a similar fashion, flip-flops A9 to A11 of tape unit selection circuits 178 (Figs. 2, 26a, 26b, and 26c) are set to correspond to the code for selection of a tape unit (discussed in connection with Figs. 3a, 3b, and 3c) by the equations $A_9=O_6P_0H_2C$, $A_{10}=O_6P_1H_2C$ and $A_{11}=O_6P_2H_2C$. The technique herein employed for the selection of one tape unit of the maximum of seven tape units operable with the computer is illustrated in Figs. 14 and 15. From Fig. 14 it is seen that each tape unit is characterized by a different binary code. The code for the desired tape unit appears in the command of Fig. 3b and by means of the above equations the status of flip-flops A9 to A11 are set to correspond to this code. Each of the seven tape units is provided with circuitry responsive only to the status of flip-flops A9 to A11 corresponding to its code. This circuitry comprises unit selector circuits 182 of Fig. 15.

Referring to unit selector circuits 182 for tape unit #1 as an example, it is seen that the true outputs of flip-flops A9 to A11 are connected by lines 185, 186, and 187, respectively, to pairs of dual terminals 1a and 1b, 2a and 2b, and 3a and 3b, respectively. As shown, crystal diodes occupy dual terminals 1a, 2b, and 3b, in correspondence with the diode positions specified for tape unit #1 in the table of Fig. 14. In general, it is seen that any diodes occupying positions 1a, 2a, and 3a are arranged as input components of logical product network 188. Since, in tape unit #1, there is a diode in position 1a and none in positions 2a and 3a, it follows that only output $A_9$ from tape unit selector circuits 178 can affect the output, on line 192, of network 188; and, only when output $A_9$ is high (at the effective potential +125 v.) will output line 192 be high. In general, also, it is seen that any diodes occupying positions 1b, 2b, and 3b are arranged as input components of logical sum network 189. Since, in tape unit #1, there are diodes in positions 2b and 3b and none in position 1b, it follows that only if both of the outputs $A_{10}$ and $A_{11}$ from tape unit selection circuits 178 are low (at the ineffective potential +100 v.) will the output of network 189 on line 193 be low. As shown, line 193 is connected to drive the grid circuit of inverter 191. Inverter 191 is a typical stage of amplification, output 194 of which is arranged, in accordance with well-known methods, to be at the high potential of +125 v. when the input (line 193) is at the low potential of +100 v. When the input (line 193) to inverter 191 is high, such as when either or both of the terms $A_{10}$ and $A_{11}$ are high, inverter 191 will draw increased current and output 194 thereof will be low. In summary, the output of network 188 on line 192 will be high only when output $A_9$ of tape unit selection circuits 178 is high; and the output of inverter 191 on line 194 will be high only when neither output $A_{10}$ nor $A_{11}$ from tape unit selection circuits 178 is high. As indicated in Fig. 15, the outputs on lines 192 and 194 are arranged as inputs to logical product network 190 by connecting these lines to the diodes thereof. Thus it is noted that only when the configuration of the states of flip-flops $A_9$ to $A_{11}$ is $A_9 A_{10}' A_{11}'$ (Fig. 14) will there be a high potential on line 195. An arrangement similar to the above characterizes unit selector circuits 182 of the other tape units except for tape unit #7, for which an inverter 191 is not required. This is because the configuration of flip-flops $A_9$ to $A_{11}$ corresponding to tape unit #7, namely, $A_9 A_{10} A_{11}$, requires diodes in positions 1a, 2a, and 3a and none in positions 1b, 2b, and 3b, thus eliminating the need for inversion.

It is further noted that a high potential on line 195 will energize coil 196 of relay R. The function of relay R is to energize signal $W_2$ or $R_2$ (which in turn connects lines $T_1$ to $T_4$ to the tape unit recorder or reader, respectively, as outlined in the referenced application, Serial Number 462,752) through connection with the line PCS2 or PCS1, respectively, only the former of which is at the high potential during the "record on tape" routine and only the latter of which is at the high potential during the "read from tape" routine, as already mentioned. When line 195 is at the low potential, relay R is open (as shown) thereby connecting both signals $W_2$ and $R_2$ to +100 v. At this potential these signals are ineffective to connect lines $T_1$ to $T_4$ to the tape unit recorder or reader. However, when line 195 is at the high potential, relay R is closed, thereby connecting signal $W_2$ to PCS2 and signal $R_2$ to PCS1. Since only PCS2 is high during the recording process, it follows that the R link of the tape unit will connect lines $T_1$ to $T_4$ to the recorder thereof.

Returning to Fig. 12a, the next statement made in word block PC#642 is that flip-flop K1 remains false. As previously noted, the function of flip-flop K1 is to signal program counter 115 to count to the next count or to either stick in the same count or skip to a different count not the next in sequence. It should be understood that the choice as to how program counter 115 should change is derived as a result of information either received or generated during each word period and set up in flip-flop K1. In the present instance, flip-flop K1 was false at the end of the word block immediately preceding PC#642 (not shown). Flip-flop K1, during PC#642, will remain false; and at the end of the word period, the computer will count out of PC#642 and enter PC#643.

It is emphasized that, for a word period, it is the status of flip-flop K1 at pulse position $O_{13}P_2$ which determines how program counter 115 should change at the end of pulse position $O_{13}P_2$ and that a triggering of flip-flop K1 at the end of $O_{13}P_2$ does not affect the decision; such triggering takes effect at the beginning of the next word period.

In PC#643 it is seen that recirculation in the H register and J buffer register continues as before.

Next it is seen that a binary digit one is inserted in the G register at $O_0P_0$. As will be shown, in all subsequent word periods of the "record on tape" routine, the G register will be recirculated without change; and, during the discussion of PC#663 hereinafter, the utility of the G register content will be seen to be used as a reference to indicate when the entire content of the J buffer register has been recorded.

The last two statements of PC#643 indicate the condition for which program counter 115 will cause the computer to count out of this block, that is, when the octal units digit of the arc addresses (Fig. 4) passing through flip-flop Mw is equal to zero, the period $O_0$ content of the H register at this time (as discussed in connection with Fig. 3b). The equations by which this action is represented are:

$$k_1 = (M_w H_2' + M_w' H_2) O_0 C \text{ and } _0 k_1 = O_{13} P_2 C.$$

To ensure that the words of the J buffer register are recorded only once, the octal units digits of the arc addresses, which are picked up by flip-flop Mw sequentially as 0 through 7, are employed as a reference. As already pointed out, for position $O_{13}P_2$ of a word period, if flip-flop K1 is false, program counter 115 will count; but if flip-flop K1 is true, program counter 115 will deviate ("stick" in the same count for the case of PC#643). The sequencing scheme employed here is to set flip-flop K1 false for counting at the end of each word period and, if during $O_0$ of the next word period the state of flip-flop Mw equals the content of the H register, to permit flip-flop K1 to remain false. Thus, within eight word periods, the state of flip-flop K1 (false) at the end of a word period will indicate that during the next word period the content of the address in the J buffer register corresponding to the number in period $O_0$ of the H register will be availble.

In PC#644, the word from address 0 of the J buffer register (as located in PC#643) is transferred to the E register by the equation $E_0 = J_2$. Also the equations $G_0 = G_5$ and $J_0 = J_2$ provide for recirculation in these registers.

The following statement in PC#644 requires that an octal digit two be inserted in period $O_0$ of the H register, accomplished by inserting a binary digit one in $O_0P_1$ of this register: $H_0 = O_0P_1$. Since the word periods during which words are transferred from the J buffer register are those for which the octal units digits of the arc addresses equal the $O_0$ content of the H register, the octal two will cause the next word to be transferred to be that of address 2 in the J buffer register.

The last statement of PC#644, as in PC#642, permits flip-flop K1 to remain false and a count is made to PC#645.

Similarity of the activity of PC#645 to prior activity is apparent. The primary function of this block is to route the word occupying address 1 in the J buffer register into the F register: $F_0 = J_2$. Thus, at the end of this time, the word from address 0 in the J buffer register is in the E register and the word from address 1 in the J buffer register is in the F register.

In PC#646, provision is made for setting up flip-flops A1 to A4 of intermediate register 176 to correspond with the least significant four binary digits of the E register and to shift the E register content four binary digit positions to the right. The former function is accomplished by the equations shown for sequentially triggering the grids of flip-flops A1 to A4 in accordance with the state of flip-flop E5 of the E register during $O_0+O_1P_0$. The latter function is accomplished by causing proposition $E_0$ to follow flip-flop E1 of the E register since, as it will be recalled from the discussion of Fig. 7, during recirculation of the E register, the information in flip-flop E1 appears as proposition $E_0$ after a time lapse of four computer clock periods. As before, note that in PC#646 the F, G, H, and J buffer registers are recirculated and flip-flop K1 remains false.

PC#647, it will be noted, is similar to PC#646 with two exceptions. One is that flip-flops L1 to L4 of input-output register 177 (Fig. 2) are set up to correspond with flip-flops A1 to A4 as shown by the equations for triggering their grids. The other exception is that flip-flop K1 is set true at $O_{13}P_2$ to provide for a repetition of PC#650.

It is in PC#s 650-660 that outputs are, for the first time, routed to the selected tape unit, and that all digits of a word, except for the binary digit of $O_{12}P_0$, are recorded.

As before, in each of the word periods of these time blocks, recirculation occurs in the F, G, H, and J buffer registers. With reference to the E register, provision is made for recirculation if flip-flop A5 is false: $E_0=E_5A_5'$; or a shift of content four binary digit positions to the right if flip-flop A5 is true: $E_0=E_1A_5$. For the first word period of PC#650, it is to be noted that flip-flop A5 is false (since it entered false). Thus, for this word period, the content of the E register, that of flip-flops A1 to A4 and that of flip-flops L1 to L4 remain static. In addition, while flip-flop K1 remains true, PC#650 will repeat. However, it is seen that PC#651 will be entered when flip-flop K1 is triggered false by the equation $_0k_1=A_{13}C$, which indicates that flip-flop K1 is triggered false by a computer clock pulse occurring when flip-flop A13 is true. It is further seen that flip-flop A13 is triggered true (it enters false) by the arrival of a tape unit clock pulse $C_t: a_{13}=C_t$. To summarize, at the fall of a tape unit clock pulse $C_t$ during PC#650, flip-flop A13 will trigger true and flip-flop K1 will trigger false at the next computer clock pulse C, thereafter. This action is shown in Fig. 6, which presents graphs illustrating the timewise synchronization of the computer and the tape unit.

In Fig. 6, line I presents the computer clock signal C, which will be employed as a timing reference in this discussion. Lines II and III show the word period divisions produced by O counter 118 and P counter 117, respectively.

It is repeated that all computer operations are in synchronization with the computer clock signal C and that all tape unit operations are in synchronization with tape unit clock signal $C_t$. The period of the latter signal, as is seen from line IV, is in excess of a computer word period, namely, at least 43 computer clock periods. However, the tape unit clock period, due to factors such as inherent variations in speed of the tape unit drive motors, may be inconstant. Thus, for the example of Fig. 6, during the first complete word period shown, a tape unit clock signal falls (i.e., a tape unit clock pulse occurs) in coincidence with the fall of the computer clock signal at $O_{13}P_1$. During the next word period, there is no tape unit clock pulse. The succeeding word period is characterized by a tape unit clock pulse fall at $O_0P_0$. During the following word period, a tape unit clock pulse fall occurs at $O_0P_1$. It should be noted that, as already explained with regard to computer clock pulses, only the fall of a clock signal is effectitve in circuitry; thus the rise of the tape unit clock signal may be ignored. It is despite this inconstancy that the invention provides means for causing computer operations to sequence in accordance with the receipt by the computer of tape unit clock signal $C_t$.

The means referred to comprises mainly flip-flop A13, the state of which, as shown in line V of Fig. 6, is set true when a tape unit clock pulse fall is received, and is set false at the succeeding computer clock pulse if flip-flop K1 is false. Flip-flop K1, in turn, changes state in accordance with the state of flip-flop A13 (line VI). Thus, program counter 115, which is controlled by flip-flop K1, cannot sequence the computer to count unless the fall of a tape unit clock pulse $C_t$ is received; this is shown in line VII, in which a "stick" in PC#650 is indicated. Also shown in line VIII is the action of flip-flop A5, which must be true for information to be transferred and for shifting in the E register to occur.

Thus, in PC#s 650-660, it is noted that only when flip-flop A5 is true are flip-flops A1 to A4 set up to correspond with the E register and, only at the fall of a tape unit clock pulse $C_t$ is the content of flip-flops A1 to A4 transferred to flip-flops L1 to L4. Lastly, it is to be noted that the states of flip-flops L1 to L4 constitute the information fed out via lines $T_1$ to $T_4$ to the tape unit (Fig. 2).

PC#661 mainly represents a repetition of the activity of PC#s 650-660 providing only for the recording of the binary digit originally occupying the $O_{13}P_1$ position of the E register.

During PC#662 it is seen, the content of the F register (word from address 1 in the J buffer register) is routed into the E register: $E_0=F_2$. The other recirculating registers of the computer are recirculated. A count out to PC#663 is made at the fall of the tape unit clock pulse $C_t$, as in PC#661.

In PC#663, as before, the content of the E register is shifted and four binary digits thereof are set up in flip-flops A1 to A4. The F register is cleared (by non-recirculation thereof) and the G, H, and J buffer registers are recirculated.

Also in this word block, the comparison of the H register content (now octal 2) at period $O_0$ with the arc addresses is made in the same manner as in PC#643 except that the result is set up in flip-flop A6. Further, flip-flop A12 is set at the end of the word period inversely to flip-flop A6: $a_{12}=A_6'O_{13}P_2C$, $_0a_{12}=A_6O_{13}P_2C$. It will be shown in discussing PC#664 that flip-flops A6 and A12 cooperate to identify word periods during which transfers are to made from the J buffer register to the F register.

The last activity shown for PC#663 is a determination of whether or not the "record on tape" routine is to be concluded. It is obvious that the routine is to be concluded if the operating mode specifies that the word already recorded (the block address word) is the only one to be recorded. Additional recording (by counting to PC#664) is provided for by the $(A_7+A_8)$ term of the $_0k_1$ equation if the operating mode, as set up in flip-flops A7 and A8, is not zero, since only when flip-flops A7 and A8 are both zero is flip-flop K1 permitted to stay true. Additional recording is also provided for by the $(G_5H_2'+G_5'H_2)$ term of the $_0k_1$ equation if not all the words of the J buffer register have been recorded. It will be recalled that in PC#643, an octal digit one was inserted in period $O_0$ of the G register and in PC#644 an octal digit two was inserted in period $O_0$ of the H register. It will be shown that during PC#673 a unit is added to the octal number two in period $O_0$ of the H register for each word recorded. Thus, when eight words are recorded, the period $O_0$ content of the G and H registers will be equal. This equality, by means of the above term of the $_0k_1$ equation, permits flip-flop K1 to remain true (the state in which it entered from PC#662).

The routine is ended if flip-flop K1 is true at $O_{13}P_2$ of PC#663 since, as shown, program counter 115 will cause the computer to skip to the routine for identifying the next command in the program. Thus, if additional recording is indicated, PC#664 is entered.

The equations relating to PC#664 have already been described except for those for flip-flops A6 and A12. These flip-flops operate in all remaining PC#s of the routine to identify word periods during which transfers are to be made from the J buffer register to the F register, i.e., word periods during which words of sequential addresses in the J buffer register are passing through arithmetic unit 114.

It has been seen that when PC#664 is entered, the word of address zero in the J buffer register has already been recorded, and the word of address 1 in the J buffer register is partially in the E register and partially in flip-flops A1 to A4. It is, therefore, desired to transfer the word of address 2 in the J buffer register to the F register (which was cleared in PC#663). This is done when this word is passing through arithmetic unit 114 during one of the PC# time blocks from PC#664 to PC#673, and the corresponding word period is identified as follows. If during one of these word periods the word of address 2 in the J buffer register is in arithmetic unit 114, flip-flop A6 remains false (as it was set at the end of the previous word period: $_0a_6 = O_{13}P_2C$); otherwise flip-flop A6 is set true as a result of a comparison made, during period $O_0$, of the information in the H register and the arc addresses passing through flip-flop $M_w$. Only when these two are equal will flip-flop A6 fail to trigger true: $a_6 = M_w H_2' + M_w' H_2) O_0 C$. It follows that, if flip-flop A6 remains false, the period $O_0$ content of the H register is the same as the octal units digit of the arc address. It is only when this condition prevails that a transfer is made from the J buffer register to the F register. The state of flip-flop A6 is utilized by flip-flop A12, which as stated, is set at the end of each word period conversely to flip-flop A6, and therefore is true during a word period only if the word of the J buffer register passing through arithmetic unit 114 is the next to be transferred to the F register. It is noted that the equation $F_0 = A_{12}J_2 + A_{12}'F_2$ accomplishes the transfer only during a word period when flip-flop A12 is true; otherwise the F register is recirculated.

An inspection of PC#665 through PC#672 will indicate no activity other than that described; the main function of these PC#'s is to provide for identification of words to be transferred from the J buffer register to the F register. It is to be noted that, in PC#672, in addition, flip-flop K1 is set true: $k_1 = O_{13}P_2C$.

The only activity of PC#673 not already described is that which adds units to periods $O_{0-3}$ of the H register, using flip-flop K1. The equation for these additions are $H_0 = (K_1 H_2' + K_1' H_2) O_{0-3}$ and $_0k_1 = H_2' O_{0-3}C$. This is interpreted as meaning that proposition $H_0$ from diode network 125 is simultaneously observing the contents of flip-flops H2 and K1. When they are different, as when adding (1+2), the equation is satisfied and a one is recorded in the H register during periods $O_{0-3}$. When they are the same, as when adding (0+0) or (1+1), the equation is not satisfied and a zero is recorded in the H register. Flip-flop K1 goes false at the end of the first clock period during which flip-flop H2 is observed to be false, and remains false for the remainder of the counting period. The result of this operation is that a unit is added to the binary number representative of the word count in the H register during PC#673.

Finally, in PC#673, flip-flop K1 is set true during $O_{13}$ to provide for a skip back to PC#650 (via line 132) in a continuation of the recording process.

Still with reference to Figs. 12a, 12b, and 12c, an illustration of the operation of the "record on tape" routine will next be presented. The operations involved in recording eight computer words recirculating in the J buffer register will be traced through the program counter blocks to show how these words are recorded on the magnetic tape of tape unit #2.

It will be assumed that a search, as aforementioned, has been completed and the multiple head of tape unit #2 is stationarily positioned at the blank area of the block address found (see Fig. 5). It should be understood that the "search for block address" command, in period $O_6$ (Fig. 3a), thus contained a coded decimal two (010) in correspondence with the code shown in Fig. 14 for tape unit #2. As in the prior discussion, it will also be assumed that the computer flow has proceeded through the process of identification of the command "record on tape" and has been sequenced to enter word block PC#642, thereby making line PCS2 of record-read selection circuits 183 (Fig. 2) high. For the purposes of the present example, the "record on tape" command (Fig. 3b) will also contain a coded decimal digit two in period $O_6$, zero in period $O_0$ to correspond to the code for the first address in the J buffer register to transfer a word to the tape; and since it will be presumed that the mode of operation is to record onto odd tape words only, the command will contain a coded digit one (001) in period $O_4$.

In PC#642 (Fig. 12a), the "record on tape" command recirculates in the H register and the words to be recorded recirculate in the J buffer register. Flip-flop A7 is set false and flip-flop A8 is set true in accordance with their respective equations, to correspond to the code for mode of operation in period $O_4$ of the H register, and thus the output ($A_7'A_8$) of mode selection circuits 179 is in storage in the registers of the tape units. As a consequence, recording will be made only in odd word portions of the preselected block on the magnetic tape (Fig. 5); the address of such odd word portions of a block being included in the record instructions sent out by the computer in response to a record operational command, in a similar manner to that described in Serial No. 462,752 for recording information during predetermined word periods in accordance with instructions previously received from the computer. Further, flip-flops A9 and A11 are set false and flip-flop A10 is set true, and thus the output ($A_9'A_{10}A_{11}'$) of tape unit selection circuits 178 causes relay R of tape unit #2 only to be closed, thereby effectively connecting lines $T_1$ to $T_4$ to the recorder thereof and setting up the magnetic tape of tape unit #2 in motion at slow speed in the forward direction.

Considering PC#s 643 to 645, a "one" is inserted in period $O_0$ of the G register and arc addresses (as serially set up in flip-flop $M_w$) are compared with the zero content of period $O_0$ of the H register. When the comparison is successful, computer words are routed from the J buffer register to the E and F registers and the content of period $O_0$ of the H register is changed to a coded octal digit two. The E register will thus contain the word from address 0 in the J buffer register and the F register will contain the word from address 1 in the J buffer register. It will be assumed that the former word is the coded decimal number XXXXXX374 (X indicates irrelevancy for this example) and that the $O_{13}P_1$ position of this word contains a binary digit one (indicates that this number is positive).

During PC#646, flip-flops A1 to A4 are set up with a coded decimal four in accordance with the least significant decimal digit four recirculating in the E register. The E register is shifted four binary digit positions to the right and thereby the coded decimal seven occupies the rightmost positions thereof.

During PC#647, flip-flops L1 to L4 are set up with a coded decimal four in accordance with the content of flip-flops A1 to A4, respectively. Flip-flops A1 to A4 are in turn set up to correspond with the "seven" of the E register. The E register is shifted as before and now contains a "three" in its rightmost position.

During each of the PC#s 650 to 660, as a result of the fall of the tape clock pulses $C_t$, recording is made and the processes of shifting in the E register and setting up both flip-flops A1 to A4 and L1 to L4 continue until the number XXXXXX374 is recorded on the magnetic tape. The binary digit one in $O_{13}P_1$ of the word is recorded on the tape during PC#661.

During PC#s 662 and 663, the E register is set up with the word originally of address 1 in the J buffer register and the F register is cleared. Flip-flops A1 to A4 are set up with the least significant decimal digit of this number. It may be noted that, if the operating mode were zero (corresponding to "block address only"), the E and F registers and flip-flops A1 to A4 would be set up with zeros, since only one word, the block address word, would be recorded. However, for this example, eight computer words are to be recorded. Thus, flip-flops A6 and A12 of time marker 173 cooperate to identify the word period that the word of address 2 in the J buffer register will pass through arithmetic unit 114. Also, since the "one" in period $O_0$ of the G register does not compare with the "two" in period $O_0$ of the H register, the computer does not sequence out of the recording routine.

During PC#664, the E register is again shifted, flip-flops A1 to A4 and L1 to L4 are set up, and the identification process being conducted by flip-flops A6 and A12 continues as before.

Flip-flops A6 and A12 function as before throughout PC#665 to PC#673 and, when the word from address 2 in the J buffer register is available, it is transferred to the F register and the "two" in period $O_0$ of the H register is changed to "three." PC#650 is then returned to, and the entire process is repeated.

Thus, after the recording sequence is conducted eight times, all eight words of the J buffer register are recorded on the tape, and when PC#663 is entered for the eighth time, the H register will contain a "one" in period $O_0$. In PC#663, this "one" will compare successfully with the "one" in period $O_0$ of the G register and the computer will sequence to the command identification routine.

Referring now to the "read from tape" routine of Figs. 13a and 13b, the former figure indicates that entrance is made from the routine which identifies the corresponding command (Fig. 3c), and which sequences the computer into block PC#601. It is to be noted that PC#601 is one of the blocks of PCS1 (Fig. 11) and thus, output line PCS1 from record-read selection circuits 183 (Fig. 2) to unit selector circuits 182 (Figs. 2 and 15) is at the high potential of +125 v.

With one exception, the statements and equations of PC#601 have already been treated in connection with Fig. 12a. Briefly, in PC#601, the H register, containing the "read from tape" command (Fig. 3c), is recirculated; the mode selection flip-flops A7 and A8 are set up to correspond with the code in period $O_4$ of the command; tape unit selection flip-flops A9 to A11 are set up to correspond with the code in period $O_6$ of the command; and flip-flop K1 stays true to control program counter 115 to skip to PC#605. The aforementioned exception refers to the statement requiring that period $O_0$ of the G register be set up to correspond with the period $O_0$ content of the H register. It will be recalled from the discussion of Fig. 3c that the H register, in period $O_0$, contains a code which identifies the address in the J buffer register to first receive a word read from the tape. This address corresponds to the units octal digit of the address in memory channels 111 to be occupied by this word when the routine has been completed, and must be preserved. Since, as will be shown, period $O_0$ of the H register is employed as a counter, the code for the address in the J buffer register is transferred to the G register.

It is in PC#605 that receipt is made by flip-flops L1 to L4 of input-output register 177 of four binary digits of the first word to be read from the tape. As indicated by the grid triggering equation for these flip-flops, as well as those for flip-flop K1, the computer sticks in PC#605 until a tape unit clock pulse $C_t$ is received, at which time the transfer is made and, at the next computer clock pulse C, flip-flop A5 is set true, and PC#606 is entered.

In PC#606, the grid triggering equations for flip-flops A1 to A4 indicate that these flip-flops are set up in accordance with the content of flip-flops L1 to L4 (the first four binary digits) at the beginning ($O_0P_0$) of the first word period, and near the end thereof ($O_{12}+O_{13}P_0$) flip-flops A1 to A4 act as a shift register (Fig. 21a) in which the information is relayed, on successive computer clock pulses C, from flip-flop A4 to flip-flop A1. Thus all information transferred by flip-flops L1 to L4 to flip-flops A1 to A4 passes through flip-flop A1. It is seen from the term $(E_5A_5'+A_1A_5)(O_{12}+O_{13}P_0)$ of the $E_0$ equation that, when flip-flop A5 is true, proposition $E_0$ follows the state of flip-flop A1; and when flip-flop A5 is false, the E register is recirculated. Thus a serial transfer of information takes place between intermediate register 176 and transfer register 175. Further, to provide space for incoming digits, a shift of contents in the E register four binary digit positions to the right occurs in accordance with the first term of the $E_0$ equation. It is thus noted that, when the computer sequences out of PC#617, the E register contains all of the first word of the tape except for the $O_{13}P_1$ binary digit, which is contained by flip-flop L1.

In PC#620, the $O_{13}P_1$ binary digit (in flip-flop L1) is transferred directly to the E register and the rest of the first word from the tape is recirculated in this register:
$E_0 = E_5(O_{0-12}+O_{13}P_0)+L_1O_{13}P_1$.

Also in PC#620, the period $O_0$ content of the H register (which is octal zero when the first word from the tape is in the E register, octal one when the second word is in the E register, etc., as will be shown) is compared with the octal units digits of the arc addresses passing through flip-flop Mw, and flip-flop K1 is set false when they are equal. This process, as already described, locates the first address in the J buffer register, and when accomplished, causes the computer to enter PC#621.

The primary function of PC#621 is to provide for transfer of the first word of the tape into the first address in the J buffer register: $J_0 = E_5$.

In PC#622 a unit is added to the period $O_0$ content of the H register, thereby identifying the next address in the J buffer register to receive a word. Similarity of the $H_0$ equation to that of PC#633 of Fig. 12c is apparent.

In PC#623, as in PC#663 of Fig. 12c, a test is made to determine whether or not the routine shall be ended, using the operating mode as set up in flip-flops A7 and A8 and the G and H registers. As seen, if the test indicates that additional words are to be introduced into the J buffer register, a skip back to PC#605 occurs, but if the test indicates to the contrary, a count out to the command identification routine occurs.

It is to be noted that, in both the recording and reading processes aforementioned, transfer of information between the computer and the tape unit is made only upon receipt of tape unit clock pulses $C_t$ by the computer. As will be recalled from the referenced application, Serial Number 462,752, tape unit clock pulses $C_t$ are not emitted continuously but are inhibited by a signal controlled by the code stored in the register in the tape unit corresponding to the mode of operation to be performed (Fig. 24). Thus, the areas of the magnetic tape on which recording is made or from which reading is done is a function of the code for mode of operation. In the recording routine, for instance, assuming that the register of the tape unit is storing the code corresponding to the mode "odd words only," the inhibiting signal will be provided during the even tape unit words $W_2, W_4, \ldots W_{16}$ (Fig. 5), thereby preventing the transmission of tape unit clock pulses $C_t$ to the computer during times when tape areas corresponding to the even tape unit words are passing under the multiple head. As a result the computer will have sufficient time to set up succeeding words from addresses in the J buffer register for transfer and, further will "stick" in PC#650 (Figs. 6 and 12b) until a tape unit clock pulse $C_t$ is sensed.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A digital computer system comprising: first means, including computer means having a moving memory and means demarking computer word periods each defined by a plurality of computer timing signals produced by the said first means; second means, including tape-unit means having a tape and including means for generating tape-unit timing signals having a period greater than that of any demarked computer word period; and third means, including means connected to said first means and to said second means and comprising first register means and second register means and circuit means, said first register means having capacity for a coded decimal digit of a computer word derived from the memory of the computer, and said second register having an output corresponding to information comprising a coded decimal digit intended to be recorded onto an area of tape of said tape unit defined by a tape-unit timing signal, and said circuit means including a first means responsive to the termination of a tape-unit timing signal to transfer a coded decimal digit from said first register to said second register for output therefrom to said tape-unit.

2. A computer system according to claim 1, said circuit means including a second means for introducing into said first register at the termination of a computer timing signal new digit-representing information derived from said computer memory, prior to occurrence of the next succeeding tape-unit timing signal.

3. A system for transferring information from the moving memory of a computer to the moving tape of a tape unit, the timing signals generated by said tape unit having a period greater than a word period defined by the timing signals of said computer, said system comprising: a one-word recirculating register synchronized to advance with said computer memory for storing a word to be recorded onto said tape; a first register capable of being setup with a coded decimal digit of the word in said one-word register; a second register whose outputs correspond to a coded decimal digit to be recorded onto an area of said tape defined by a tape unit timing signal period; a first circuit means responsive to the fall of a timing signal from said tape unit to transfer the coded decimal digit from said first register into said second register; and a second circuit means for resetting said first register with the next coded decimal digit of the word in said recirculating register prior to receiving the next timing signal from said tape unit.

4. A system for transferring coded numbers from the memory of a digital computer to a storage device, comprising: first and second registers each capable of storing one number; network means for setting up said first register to correspond with a number from the memory; network means for serially setting up said second register so as to successively correspond with the remainder of the numbers stored in said memory; a third register controlled by timing signals generated in the computer to be serially set up so as to successively correspond to a coded digit of the number in said first register; a fourth register having outputs to be recorded onto said storage device, said fourth register controlled by timing signals generated in the storage device to be set up to correspond to the coded digit of said third register; and means for serially setting up said first register to correspond with said second register.

5. A system for reading out words from the memory of a digital computer to a storage device comprising: a multi-word period recirculating register storing coded signals representing the words; a one-word period recirculating register synchronized to advance with said multi-word period recirculating register; means for serially inserting in said one-word period recirculating register coded signals corresponding to one of the words of said multi-word period recirculating register; a static register capable of being serially set up with groups of coded signals corresponding to the coded signals of said one-word period recirculating register and having a plurality of simultaneous outputs in accordance with the coded signal content thereof; and means for simultaneously transferring the output of said static register into the storage device.

6. A system for transference of words from the memory of a computer to the moving tape of one of a plurality of tape units, the timing signals generated by a tape unit having a period greater than a word period defined by the timing signals generated by said computer, said system comprising: a tape unit selector device associated with said computer; a gating circuit associated with each said tape unit, each said gating circuit operable to connect its tape unit to said computer in response to a unique set of signals from said tape unit selector device; means for setting said tape unit selector device to correspond to the signals indicative of one of said tape units; a first register capable of being set up with digital information derived from the memory of said computer; a second register whose outputs correspond to information to be recorded onto an area of said tape defined by a tape unit timing signal period; a first circuit means responsive to the timing signals of said tape unit to transfer information from said first register into said second register; and a second circuit means for resetting said first register with new digital information derived from the memory of said computer prior to receiving the next timing signal from said tape unit.

7. A system for transference of words from the memory drum of a computer to the moving tape of a tape unit, the timing signals generated by said tape unit recurring at a rate less than the word rate of said computer, said system comprising: a buffer register on said drum for storing a plurality of words to be recorded onto said tape; a one-word recirculating register on said drum for storing the word to be next recorded onto said tape; a first register capable of being set up with a coded digit of the word in said one-word recirculating register; a second register whose outputs correspond to the coded signals to be recorded onto an area of said tape defined by a tape unit timing signal period; a first circuit means responsive to the timing signals of said tape unit to successively transfer the coded digits from said first register into said second register; a second circuit means for resetting said first register with the next coded digit from the word in said one-word register prior to receiving the next timing signal from said tape unit; and means for transferring the next word in said buffer register into said one-word recirculating register after all the coded digits of said first word have been recorded.

8. A system for transferring information from a digital computer to a magnetic tape, comprising: a rotating magnetic drum memory; a reference channel on said memory having word-period identifying signals repeated at intervals equal to a sub-multiple of the cycle period of said memory; a first one word-period recirculating register utilizing the surface of said drum memory; a second one word-period recirculating register utilizing the surface of said drum memory and having a word-period identifying signal corresponding to a signal on said reference channel; comparing means for generating a signal when the signal in said second recirculating register is equal to the signals sensed from said reference channel; a third recirculating register utilizing the surface of said drum memory having a delay period equal to the sub-multiple of the cycle period of said memory; a plurality of output lines, each connected to actuate recording elements positioned along the magnetic tape, each of said output lines corresponding to a group of digit positions in said first recirculating register; means for inserting in said first recirculating register coded signals representing a word of said third recirculating register in response to the signals generated by said comparing means; and means for successively generating, on said output lines, signals corresponding to a group of digits of the word represented by coded signals in said first recirculating register.

9. A system for transferring information from the moving tape of a tape unit to the moving memory of a computer, the timing signals generated by said tape unit having a period greater than a word period as defined by the timing signals of said computer, said system comprising: a first register; a second register; a plurality of lines for signals sensed from the tape of said tape unit; a first circuit means for setting up said first register at the fall of a timing signal from said tape unit in accordance with the signals on said lines; and a second circuit means for transferring information from said first register to said second register and shifting said information to the memory of said computer prior to the fall of the next timing signal received from said tape unit.

10. A system for reading information into the memory of a digital computer, said information recorded in the form of groups of magnetized areas on a magnetic tape, the signals in each group being simultaneously sensed from the magnetic tape by a plurality of sensing elements, comprising: a multi-word period recirculating register cooperating with the memory of said computer; a one-word period recirculating register cooperating with the memory; a static register capable of being successively set up with coded signals in accordance with the signals of the sensing elements corresponding to each of the magnetized areas; means to serially set up said one-word period recircuating register with coded signals corresponding to those of said static register until said one-word period recirculating register is filled to capacity; and means to serially set up said multi-word period recirculating register with coded signals corresponding to those of said one-word period recirculating register until said multi-word period recirculating register is filled to capacity.

11. An input circuit for a digital computer, comprising: a first recirculating device for binary information and having an input; a second recirculating device for binary information, operating simultaneously with said first recirculating device and having an input and an output; a storage device for binary information, also having an input and an output; signal generating means for sensing a group of information to be read into the computer, and having an output; networks to set up said storage device in accordance with the output from said signal generating means; and additional networks to connect the output of said storage device to the input of said second recirculating device and to serially connect the output of said second recirculating device to the input of said first recirculating device.

12. In a system for reading out a plurality of numbers stored in the memory of a digital computer to a magnetic tape unit capable of recording coded signals representing the numbers when set up in a storage register, comprising: a first recirculating register cooperating with the memory and having a capacity of one number; a second recirculating register cooperating with the memory and also having a capacity of one number; means for setting up said first recirculating register with coded signals representing a number stored in the memory; means for setting up said second recirculating register with coded signals representing each of the other numbers stored in the memory in sequence; means for sequentially setting up said first recirculating register to correspond with said second recirculating register; a first storage register having a capacity of one digit; means to sequentially set up said first storage register with coded signals representing digits of the number represented by the coded signals in said first recirculating register; a second storage register also having a capacity of one digit; and means to set up said second storage register with coded signals corresponding with those of said first storage register.

13. In a digital computer system with a plurality of storage devices connected thereto, means to select among the storage devices for communication with the computer, comprising: a register capable of being set up by the computer in one of a plurality of configurations, each configuration corresponding to a different one of the storage devices, said register having a different output signal characteristic of each configuration; selective circuits including logical product and sum networks in each storage device, said selective circuits operable to generate a signal in response to only one output signal from said register; and relay means in each storage device, said relay means operable in response to a signal generated by its associated selective circuits to energize the transmitting and receiving circuits of the storage device.

14. In a digital computer system with a plurality of storage devices connected thereto, means to select among the storage devices for communication with the computer, comprising: a register capable of being set up by the computer in one of a plurality of configurations, each configuration corresponding to a different one of the storage devices, said register having a different output signal characteristic of each configuration; selective circuits including logical product and sum networks in each storage device, said selective circuits operable to generate a signal in response to only one output signal from said register; relay means in each storage device, said relay means operable in response to a signal generated by its associated selective circuits to energize the transmitting and receiving circuits of the storage device; and means responsive to the computer for rendering either the transmitting or receiving circuits of the storage device operable.

15. A system for rendering one of a plurality of devices operable in accordance with binary coded signals derived from a common source, said system comprising: a plurality of flip-flop circuits located at said common source, each said flip-flop circuit providing a "zero" or "one" signal on an output thereof, depending on the binary code stored therein; a gating circuit located at each of said devices, each defined by a binary code capable of being set up in said flip-flop circuits, each said gating circuit comprised of: a logical "and" circuit having an input thereto connected to an output of a flip-flop circuit which provides a "one" in the code therefor, and a logical "or" circuit having an input thereto connected to an output of a flip-flop circuit which provides a "zero" in the code therefor; an inverter circuit connected to an output of said logical "or" circuit; and a second logical "and" circuit responsive to the output of said first logical "and" circuit and said inverter circuit, whereby one of said gating circuits generates an output signal for actuating the selected device in response to a binary code set up in said flip-flop circuits.

16. A system for transferring words from the memory of a computer to the moving tape of one of a plurality of tape units, the timing signals generated by each tape unit having a period greater than a word period defined by the timing signals generated by said computer, said system comprising: a group of flip-flops in said computer capable of being set up into one of a plurality of configurations, each configuration corresponding to a different one of the tape units; selective circuits including logical product and sum networks associated with each tape unit, each said selective circuits operable to generate a signal in response to one of the configurations set up in said group of flip-flops; relay means in each tape unit, said relay means operable in response to a signal generated by the associated selective circuits to connect its tape unit to the computer; a first register in said computer capable of being set up with digital information derived from the memory thereof; a second register in said computer whose outputs correspond to information to be recorded onto an area of the tape of the selected tape unit, said area defined by the tape unit timing signal period; a first circuit means responsive to the timing signals of the selected tape unit to transfer information from said first register into said second register; and a second circuit means for resetting said first register with new digital information derived from the memory of said computer prior to receiving the next timing signal from the selected tape unit.

17. A system adapted to transfer digital data between a computer memory operating at a computer clock pulse rate, and a tape data-storage means which operates at a rate slower than the computer, said system comprising in combination with computer memory and clock means and tape data-storage means and means providing a tape rate signal; a means connected between the computer memory and the tape data-storage means and effective in response to termination of a tape rate signal to perform said transfer of data.

18. A system adapted to transfer digital data between a defined address in a computer memory operating at a computer clock rate, and a defined address in a tape data-storage unit operating at a tape clock rate slower than that of the computer, comprising in combination with the computer memory and the tape data-storage unit and means providing respective timing signals at respective rates of the two clock rates, a means including first and second registers connected between the computer memory and the tape data-storage unit and effective in response to fall of a tape clock signal to transfer a digit of data from said first register to said second register and to said tape data-storage unit and responsive to a subsequent fall of a computer clock signal to perform a transfer of a succeeding digit of data into said first register in readiness for subsequent transfer to said second register and said tape unit.

19. In a digital computer system comprising a computer unit comprising an arithmetic unit and a main computer memory means operating at a computer clock rate defined by computer clock signals provided by the computer unit, said system comprising an auxiliary data-storage means comprising a movable tape operating at a tape clock rate slower than said computer clock rate and the tape clock rate being defined by tape clock signals provided by the data-storage means, said system also comprising transducer means for entering data into and extracting data from, respective ones of the memory means and the data-storage means, the combination with all the aforementioned means of data-transfer means operationally interposed between and interconnecting the main computer memory and the auxiliary data-storage means, said data-transfer means comprising a means successively responsive first to a tape clock signal and thereafter to termination of a computer clock signal to correlate timing and control transfer of data between said memory and said storage means.

References Cited in the file of this patent

UNITED STATES PATENTS

| | | |
|---|---|---|
| 1,498,544 | Fowler | June 24, 1924 |
| 2,609,143 | Stibitz | Sept. 2, 1952 |
| 2,611,025 | Jankowski | Sept. 16, 1952 |
| 2,679,638 | Bensky | May 25, 1954 |
| 2,701,095 | Stibitz | Feb. 1, 1955 |
| 2,702,380 | Brustman | Feb. 15, 1955 |
| 2,708,267 | Weidenhammer | May 10, 1955 |
| 2,721,990 | McNancy | Oct. 25, 1955 |
| 2,817,829 | Lubkin | Dec. 24, 1957 |
| 2,850,234 | Bartelt et al. | Sept. 2, 1958 |

FOREIGN PATENTS

| | | |
|---|---|---|
| 167,102 | Australia | Feb. 11, 1954 |

UNITED STATES PATENT OFFICE
CERTIFICATION OF CORRECTION

Patent No. 2,978,685                          April 4, 1961

Donald E. Eckdahl et al.

It is hereby certified that error appears in the above numbered patent requiring correction and that the said Letters Patent should read as corrected below.

Column 8, line 62, for "sequencies" read -- sequences --; column 10, line 42, for "counted' read -- counter --; column 12, line 48, for "schmatic" read -- schematic --; line 73, for "$Q_{13}P_2$" read -- $O_{13}P_2$ --; same column 12, line 75, for $Q_0P_0$" -- $O_0P_0$ --; column 16, line 21, for "sequencies" read -- sequences --; column 18, line 45, for "availble" read -- available --; column 19, line 69, for "effectitve" read -- effective --; column 20, line 44, after "to", first occurrence insert -- be --; column 21, line 27, for "A6" read -- A6 --; line 53, for "(1+2)" read -- (1+0) --; column 25, line 45, for "setup" read -- set up --; column 27, line 36, for "recircuating" read -- recirculating --; column 29, line 19, for "signal;" read -- signal, --; column 30, line 17, after "to" insert -- termination of --.

Signed and sealed this 29th day of August 1961.

(SEAL)
Attest:

ERNEST W. SWIDER                          DAVID L. LADD
Attesting Officer                             Commissioner of Patents